US012793190B2

(12) United States Patent
Le et al.

(10) Patent No.: US 12,793,190 B2
(45) Date of Patent: Nov. 10, 2026

(54) BETA DISTRIBUTION-BASED GLOBAL TONE MAPPING AND SEQUENTIAL WEIGHT GENERATION FOR TONE FUSION

(71) Applicant: Samsung Electronics Co., Ltd., Suwon-si (KR)

(72) Inventors: Nguyen Thang Long Le, Garland, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 18/537,575

(22) Filed: Dec. 12, 2023

(65) Prior Publication Data

US 2025/0191152 A1 Jun. 12, 2025

(51) Int. Cl.

*G06T 5/92* (2024.01)
*G06T 5/40* (2006.01)
*G06T 5/50* (2006.01)
*G06T 5/94* (2024.01)

(52) U.S. Cl.

CPC .................. *G06T 5/92* (2024.01); *G06T 5/40* (2013.01); *G06T 5/50* (2013.01); *G06T 5/94* (2024.01); *G06T 2207/20221* (2013.01)

(58) Field of Classification Search

None

See application file for complete search history.

(56) References Cited

U.S. PATENT DOCUMENTS

| | | | |
|---|---|---|---|
| 7,885,462 | B2 | 2/2011 | Paik |
| 8,723,978 | B2 | 5/2014 | Kwon et al. |
| 9,826,171 | B2 | 11/2017 | Tan et al. |
| 10,607,325 | B2 | 3/2020 | Li et al. |
| 11,128,809 | B2 | 9/2021 | Zhen et al. |
| 12,243,201 | B2 | 3/2025 | Nossek et al. |

(Continued)

FOREIGN PATENT DOCUMENTS

| | | | |
|---|---|---|---|
| CN | 108198152 | A | 6/2018 |
| CN | 108717690 | B | 3/2022 |

(Continued)

OTHER PUBLICATIONS

International Search Report and Written Opinion of the International Searching Authority dated Sep. 6, 2024 in connection with International Patent Application No. PCT/KR2024/004334, 12 pages.

(Continued)

*Primary Examiner* — Siamak Harandi
*Assistant Examiner* — Annie H Pham

(57) ABSTRACT

A method includes obtaining a high dynamic range (HDR) image and generating low dynamic range (LDR) images based on the HDR image, where at least some of the LDR images are associated with different exposure levels. The method also includes generating tone-type weight maps based on the LDR images, where at least one of the LDR images is associated with two or more of the tone-type weight maps. The method further includes generating blending weights for the LDR images based on the tone-type weight maps, where the blending weights for at least one of the LDR images are based on at least two tone-type weight maps associated with at least two of the LDR images.

20 Claims, 18 Drawing Sheets

(56) References Cited

U.S. PATENT DOCUMENTS

| | | | | |
|---|---|---|---|---|
| 2016/0255356 | A1* | 9/2016 | Ström | H04N 19/154 375/240.08 |
| 2017/0132771 | A1 | 5/2017 | Agaian et al. | |
| 2017/0272690 | A1 | 9/2017 | Seifi et al. | |
| 2020/0134787 | A1* | 4/2020 | Bouzaraa | G06T 5/73 |
| 2022/0020126 | A1 | 1/2022 | Zhen et al. | |
| 2022/0021802 | A1 | 1/2022 | Le et al. | |
| 2023/0114798 | A1 | 4/2023 | Nossek et al. | |
| 2023/0217116 | A1 | 7/2023 | Narasimha et al. | |

FOREIGN PATENT DOCUMENTS

| | | | | |
|---|---|---|---|---|
| CN | 116095502 | A | 5/2023 | |
| CN | 116309082 | A | 6/2023 | |
| KR | 10-2022-0028814 | A | 3/2022 | |
| KR | 10-2023-0045498 | A | 4/2023 | |
| WO | WO-2020211334 | A1 * | 10/2020 | H04N 23/76 |

OTHER PUBLICATIONS

Le et al., "Machine Learning Segmentation-Based Tone Mapping in High Noise and High Dynamic Range Environments or Other Environments," U.S. Appl. No. 18/454,247, filed Aug. 23, 2023, 31 pages.
"Adaptive histogram equalization," Wikipedia, Oct. 2022, 4 pages.
"Image histogram," Wikipedia, Nov. 2022, 2 pages.
"Beta distribution," Wikipedia, Dec. 2023, 53 pages.

* cited by examiner

BETA DISTRIBUTION-BASED GLOBAL TONE MAPPING AND SEQUENTIAL WEIGHT GENERATION FOR TONE FUSION

TECHNICAL FIELD

This disclosure relates generally to image processing systems. More specifically, this disclosure relates to beta distribution-based global tone mapping and sequential weight generation for tone fusion.

BACKGROUND

Many mobile electronic devices, such as smartphones and tablet computers, include cameras that can be used to capture still and video images. In some cases, electronic devices can capture multiple image frames of the same scene at different exposure levels and blend the image frames to produce a high dynamic range (HDR) image of the scene. The HDR image generally has a larger dynamic range than any of the individual image frames. Among other things, blending the image frames to produce the HDR image can help to incorporate greater image details into both darker regions and brighter regions of the HDR image.

SUMMARY

This disclosure relates to beta distribution-based global tone mapping and sequential weight generation for tone fusion.

In a first embodiment, a method includes obtaining a high dynamic range (HDR) image and generating low dynamic range (LDR) images based on the HDR image, where at least some of the LDR images are associated with different exposure levels. The method also includes generating tone-type weight maps based on the LDR images, where at least one of the LDR images is associated with two or more of the tone-type weight maps. The method further includes generating blending weights for the LDR images based on the tone-type weight maps, where the blending weights for at least one of the LDR images are based on at least two tone-type weight maps associated with at least two of the LDR images In other embodiments, a non-transitory machine readable medium contains instructions that when executed cause at least one processor of an electronic device to perform the method of the first embodiment.

In a second embodiment, an electronic device includes at least one processing device configured to obtain an HDR image and generate LDR images based on the HDR image, where at least some of the LDR images are associated with different exposure levels. The at least one processing device is also configured to generate tone-type weight maps based on the LDR images, where at least one of the LDR images is associated with two or more of the tone-type weight maps. The at least one processing device is further configured to generate blending weights for the LDR images based on the tone-type weight maps, where the blending weights for at least one of the LDR images are based on at least two tone-type weight maps associated with at least two of the LDR images.

In a third embodiment, a method includes obtaining an input image and generating an image histogram based on the input image. The method also includes identifying a clip limit and updating the image histogram based on the clip limit in order to generate an updated image histogram. The method further includes generating an image transform based on the updated image histogram and updating the image transform based on specified beta coefficient values in order to generate an updated image transform. In addition, the method includes applying the updated image transform to the input image in order to generate a contrast-enhanced image. In other embodiments, an electronic device includes at least one processing device configured to perform the method of the third embodiment. In still other embodiments, a non-transitory machine readable medium contains instructions that when executed cause at least one processor of an electronic device to perform the method of the third embodiment.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive." and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B." "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and donot limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112 (f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112 (f).

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
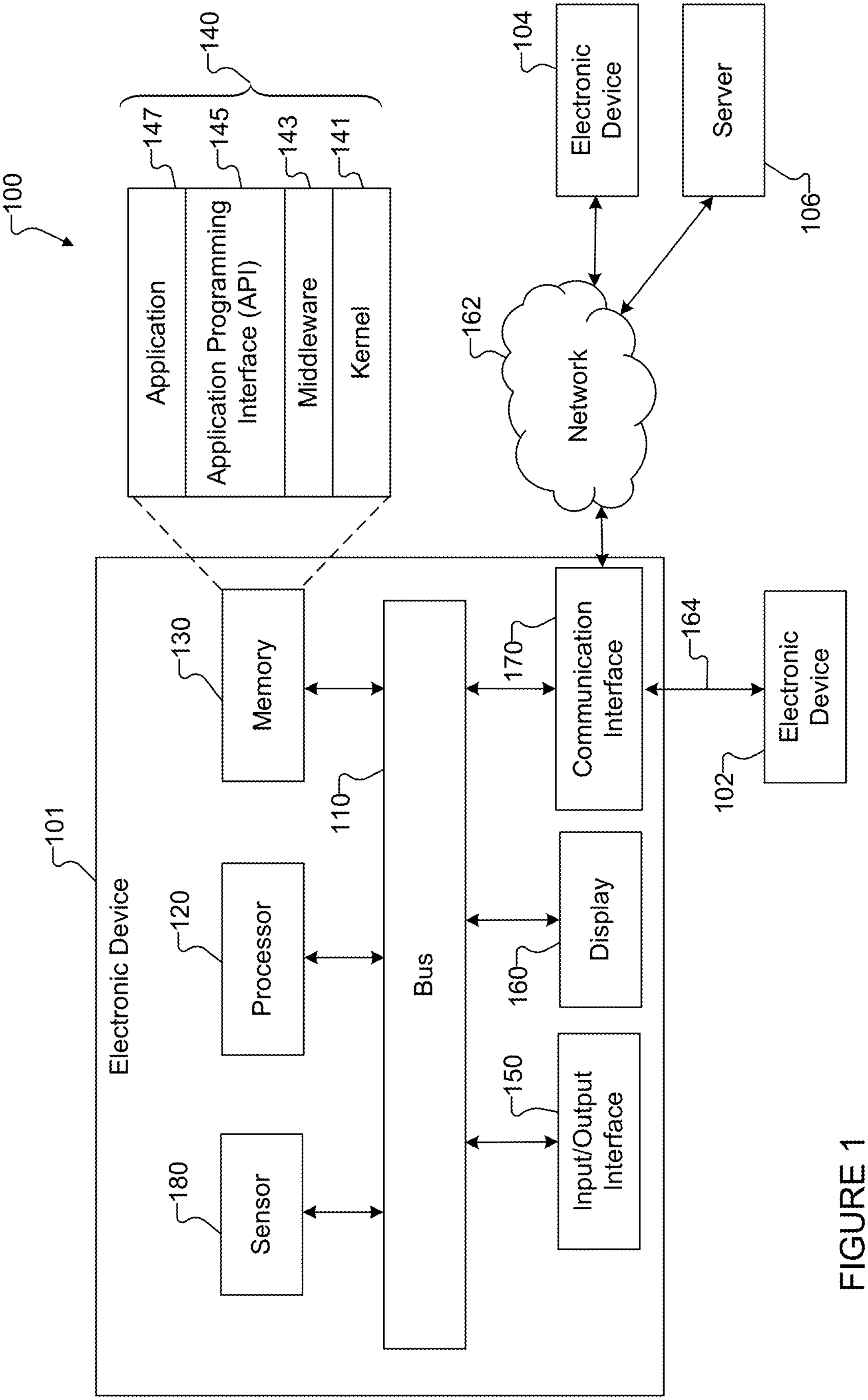
FIG. 1 illustrates an example network configuration including an electronic device in accordance with this disclosure.

FIGS. 1 through 18, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, many mobile electronic devices, such as smartphones and tablet computers, include cameras that can be used to capture still and video images. In some cases, electronic devices can capture multiple image frames of the same scene at different exposure levels and blend the image frames to produce a high dynamic range (HDR) image of the scene. The HDR image generally has a larger dynamic range than any of the individual image frames. Among other things, blending the image frames to produce the HDR image can help to incorporate greater image details into both darker regions and brighter regions of the HDR image.

Various attempts have been made to increase both the dynamic range and the brightness of images captured using mobile electronic devices or other electronic devices. For example, increased dynamic range and increased brightness may be desired when capturing images at night or in other dark environments. In some cases, these attempts have involved capturing images using shorter and shorter exposure values. For instance, some approaches may capture images between the EV-0 and EV-6 exposure levels and blend the images together in order to produce an HDR image. However, these approaches can suffer from a number of issues. Among other things, it is increasingly challenging for state-of-the-art tone-mapping algorithms to maintain contrast in HDR images, which results in hazier HDR images being generated. Moreover, increasing the dynamic range can make it harder to capture HDR images of scenes while achieving desired HDR effects when the scenes include highlights like neon lights. In addition, attempting to tune some techniques to achieve stronger contrast and HDR effects may produce side-effects that can be observed by users, such as halo/dark spot artifacts which can be immediately noticeable to the users. As particular examples, global contrast enhancement techniques like contrast-limited histogram equalization (CLHE) may brighten an image too much due to uniform equalization, while tile-based or local contrast enhancement techniques like contrast-limited adaptive histogram equalization (CLAHE) can keep brightness unchanged but introduce dark spots.

This disclosure provides various techniques for sequential weight generation for tone fusion. As described in more detail below, an HDR image can be obtained, and low dynamic range (LDR) images can be generated based on the HDR image. At least some of the LDR images can be associated with different exposure levels, such as when the LDR images include an LDR long exposure image, an LDR medium exposure image, and multiple LDR short exposure images. Tone-type weight maps can be generated based on the LDR images, where at least one of the LDR images can be associated with two or more of the tone-type weight maps. For instance, a mid tone weight map may be generated for the LDR long exposure image; a dark tone weight map, a mid tone weight map, and a bright tone weight map may be generated for the LDR medium exposure image; and a mid tone weight map and a bright tone weight map may be generated for each of the LDR short exposure images. Blending weights for the LDR images can be generated based on the tone-type weight maps, where the blending weights for at least one of the LDR images can be based on at least two tone-type weight maps associated with at least two of the LDR images. For example, the blending weights for the LDR long exposure image may be based on the mid tone weight map for the LDR long exposure image and the dark tone weight map for the LDR medium exposure image. The mid tone weight map for the LDR medium exposure image may be used as the blending weights for the LDR medium exposure image. For each of the LDR short exposure images, the blending weights for the LDR short exposure image may be based on the mid tone weight map for the LDR short exposure image and the bright tone weight map for the LDR medium exposure image or another of the LDR short exposure images. The blending weights may be used in any suitable manner, such as to perform fusion-based local tone mapping in order to fuse the LDR images and generate a fused image. The fused image may undergo global tone mapping, such as beta distribution-based global tone mapping, to generate a tone-mapped image.

This disclosure also provides various techniques for beta distribution-based global tone mapping. As described in more detail below, an input image can be obtained, and an image histogram can be generated based on the input image. A clip limit can be identified, such as based on a desired contrast strength. For example, a value of the clip limit that separates an area under a curve of the image histogram into a first area above the clip limit and a second area below the clip limit can be identified, where a ratio involving at least one of the first and second areas may satisfy or be based on the desired contrast strength. The image histogram can be updated based on the clip limit in order to generate an updated image histogram, such as to help limit contrast enhancement. An image transform can be generated based on the updated image histogram, and the image transform can be updated based on specified beta coefficient values in order to generate an updated image transform. For instance, the specified beta coefficient values may be selected so that the updated image transform reduces or avoids a brightening effect or a darkening effect caused by the image transform. In some cases, the specified beta coefficient values can also be selected so that the updated image transform remains within a specified range of an identity transform. In some cases, the updated image transform provides contrast enhancement while reducing or minimizing brightness changes to the input image. The updated image transform can be applied to the input image in order to generate a contrast-enhanced image.

In this way, one or both of sequential weight generation for tone fusion and beta distribution-based global tone mapping may be used to provide improved tone-mapping. Among other things, this can help to maintain contrast in HDR images being generated, which can help to reduce or minimize haziness in the HDR images. Also, this can help to improve the quality of images captured of scenes having highlights like neon lights. In addition, this can help to achieve improved contrast and HDR effects while reducing or avoiding side-effects like halo/dark spot artifacts, which can increase the overall quality of the HDR images.

Note that in the following discussion, it may often be assumed that the described techniques for sequential weight generation for tone fusion are used in the same device or system as the described techniques for beta distribution-based global tone mapping. However, this is not necessarily required. That is, sequential weight generation for tone fusion may be used with or without beta distribution-based global tone mapping, and beta distribution-based global tone mapping may be used with or without sequential weight generation for tone fusion.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), a graphics processor unit (GPU), or a neural processing unit (NPU). The processor 120 is able to perform control on at least one of the other components of the electronic device 101 and/or perform an operation or data processing relating to communication or other functions. As described below, the processor 120 may be used to perform sequential weight generation for tone fusion and/or beta distribution-based global tone mapping.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for performing sequential weight generation for tone fusion and/or beta distribution-based global tone mapping. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to perform sequential weight generation for tone fusion and/or beta distribution-based global tone mapping.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
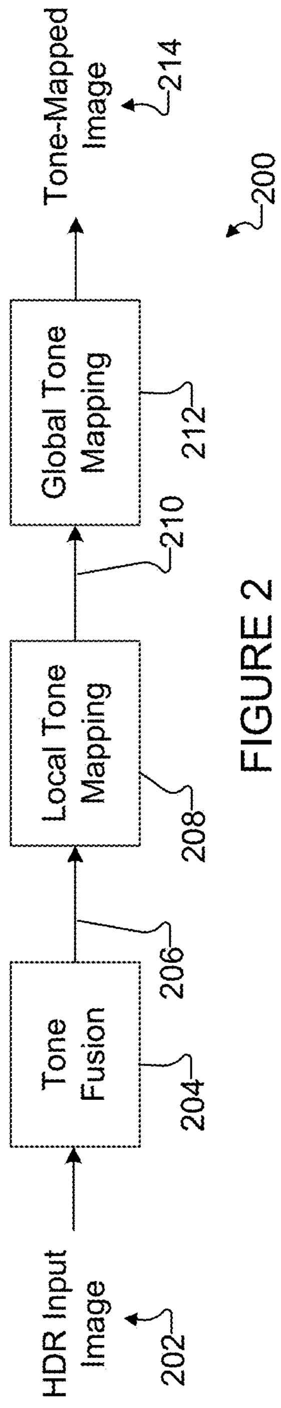
FIG. 2 illustrates an example tone mapping pipeline in accordance with this disclosure.

FIG. 2 illustrates an example tone mapping pipeline 200 in accordance with this disclosure. For ease of explanation, the pipeline 200 shown in FIG. 2 is described as being implemented on or supported by the electronic device 101 in the network configuration 100 of FIG. 1. However, the pipeline 200 shown in FIG. 2 could be used with any other suitable device(s) and in any other suitable system(s), such as when the pipeline 200 is implemented on or supported by the server 106.

As shown in FIG. 2, the pipeline 200 generally operates to receive and process HDR input images 202. Each HDR input image 202 represents an image generated using multiple image frames, where the HDR input image 202 has a higher dynamic range than any of the individual image frames used to generate the HDR input image 202. Each HDR input image 202 may be generated in any suitable manner. In general, this disclosure is not limited to any specific technique(s) for producing HDR images. Each HDR input image 202 can have any suitable format, such as a Bayer or other raw image format, a red-green-blue (RGB) image format, or a luma-chroma (YUV) image format. Each HDR input image 202 can also have any suitable resolution, such as up to fifty megapixels or more.

Each HDR input image 202 is provided to a tone fusion operation 204, which generally operates to process the HDR input image 202 in order to modify the dynamic range of the HDR input image 202 and generate a modified or fused image 206. This can be done so that the fused image 206 can be displayed or otherwise presented in a form having a smaller dynamic range. This may be done, for instance, when an HDR image is to be presented on a display device having a smaller dynamic range than the HDR image itself. For example, the tone fusion operation 204 may generate multiple low dynamic range (LDR) images using the HDR input image 202, where each LDR image has a lower dynamic range than the HDR input image 202. The tone fusion operation 204 may also generate blending weight maps based on the LDR images and perform weighted blending of the LDR images to generate the fused image 206. As described in more detail below, in some embodiments, the tone fusion operation 204 may support sequential weight generation during generation of the blending weight maps.

Each fused image 206 generated by the tone fusion operation 204 may be processed using a local tone mapping operation 208, which generally operates to apply local tone mapping to the fused image 206 in order to generate a locally-tone mapped image 210. Local tone mapping typically involves applying different tone mappings to different areas of an image. As such, the local tone mapping operation 208 is often referred to as a spatially-varying tone mapping operation since the tone mapping varies across the image. In some embodiments, the local tone mapping operation 208 can apply one or more profile gain table map (PGTM) tables or other local tone maps to image data of the fused image 206 in order to generate the locally-tone mapped image 210. The local tone mapping operation 208 may use any suitable technique(s) to perform local tone mapping. Note, however, that the local tone mapping operation 208 is optional and may be omitted from the pipeline 200.

Each locally-tone mapped image 210 generated by the local tone mapping operation 208 (or each fused image 206 generated by the tone fusion operation 204) may be processed using a global tone mapping operation 212, which generally operates to apply global tone mapping in order to generate a tone-mapped image 214. Global tone mapping typically involves applying a common tone mapping to an entire image. As such, the global tone mapping operation 212 is often referred to as a spatially-uniform tone mapping operation since the tone mapping is consistent across the image. As described in more detail below, in some embodiments, the global tone mapping operation 212 can support beta distribution-based global tone mapping, which involves using a beta distribution (a non-uniform distribution) to define the global tone mapping.

Although FIG. 2 illustrates one example of a tone mapping pipeline 200, various changes may be made to FIG. 2. For example, the pipeline 200 shown in FIG. 2 represents one example of a pipeline in which beta distribution-based global tone mapping and/or sequential weight generation for tone fusion may be used. However, either or both of beta distribution-based global tone mapping and sequential weight generation may be used in any other suitable pipelines or other architectures.

Figure 3:
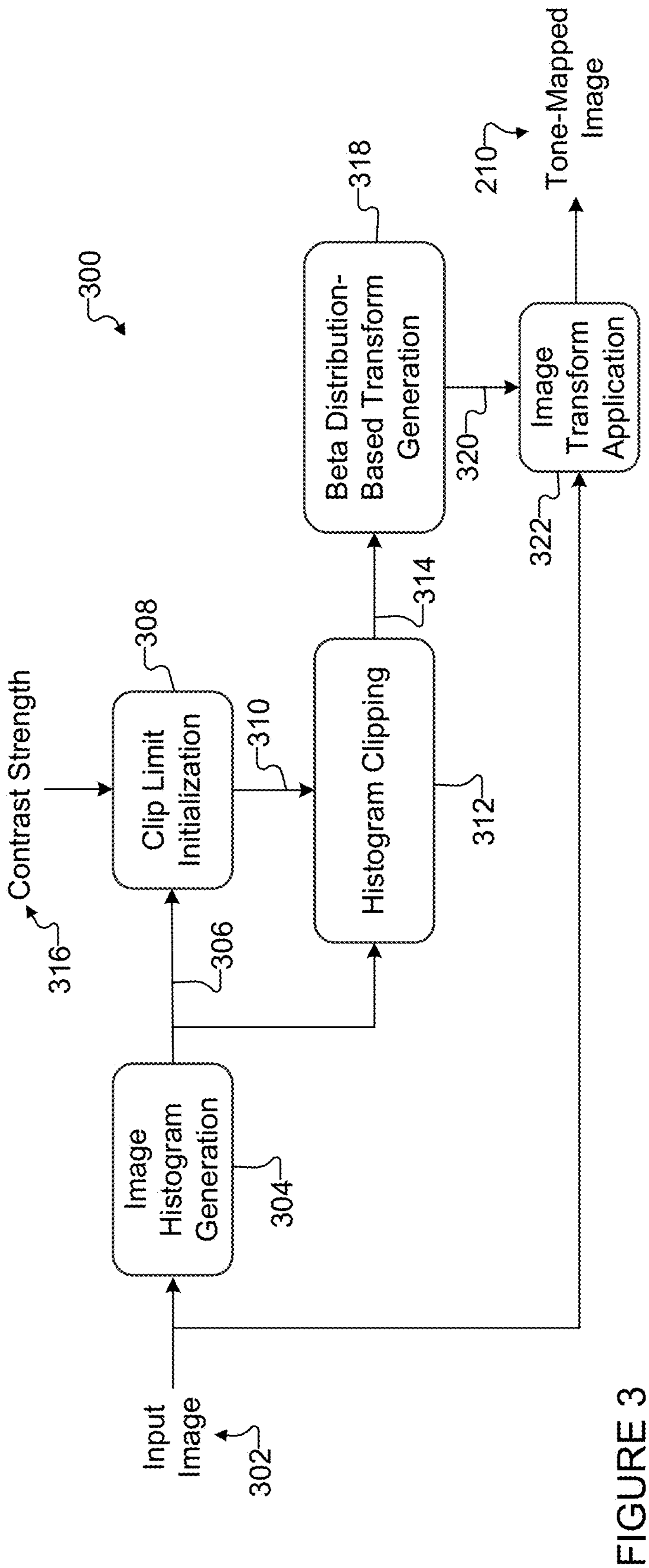
FIG. 3 illustrates an example architecture for beta distribution-based global tone mapping in accordance with this disclosure.

FIG. 3 illustrates an example architecture 300 for beta distribution-based global tone mapping in accordance with this disclosure. For ease of explanation, the architecture 300 shown in FIG. 3 is described as being used by the global tone mapping operation 212 in the pipeline 200 shown in FIG. 2, which may be implemented on or supported by the electronic device 101 in the network configuration 100 of FIG. 1. However, the architecture 300 shown in FIG. 3 could be used with any other suitable device(s) and pipeline(s) and in any other suitable system(s), such as when the architecture 300 is implemented on or supported by the server 106.

As shown in FIG. 3, the architecture 300 generally operates to receive and process input images 302. Each input image 302 represents an image to be processed in order to provide global tone mapping. In some embodiments, each input image 302 may represent a locally-tone mapped image 210 generated by the local tone mapping operation 208 or a fused image 206 generated by the tone fusion operation 204 in the pipeline 200 of FIG. 2. Each input image 302 is provided to an image histogram generation function 304, which generally operates to process the input image 302 and generate an image histogram 306 of the input image 302. An image histogram 306 represents a type of histogram that acts as a graphical representation of the tonal distribution in the associated input image 302. For example, each image histogram 306 can plot the number of pixels in the associated input image 302 for each possible tonal value. By generating the image histogram 306 for each input image 302, the entire tonal distribution of that input image 302 can be identified.

The image histogram 306 for each input image 302 is provided to a clip limit initialization function 308, which generally operates to process the image histogram 306 in order to identify a clip limit 310 to be applied to the image histogram 306 A histogram clipping function 312 generally operates to process the image histogram 306 for each input image 302 and clip the image histogram 306 for that input image 302 based on the identified clip limit 310 for that input image 302 in order to generate a clipped or updated image histogram 314 for that input image 302. For example, the histogram clipping function 312 may generate the updated image histogram 314 for each input image 302 by capping values in the associated image histogram 306 at the associated clip limit 310 and redistributing pixels within the associated image histogram 306. High peaks in an image histogram 306 can correspond to large slopes in an image transform curve to be applied to an input image 302, which can result in over-enhancement. Clipping the histogram peaks can therefore help to limit contrast enhancement and reduce or avoid over-enhancement of the input image 302.

Figure 4A:
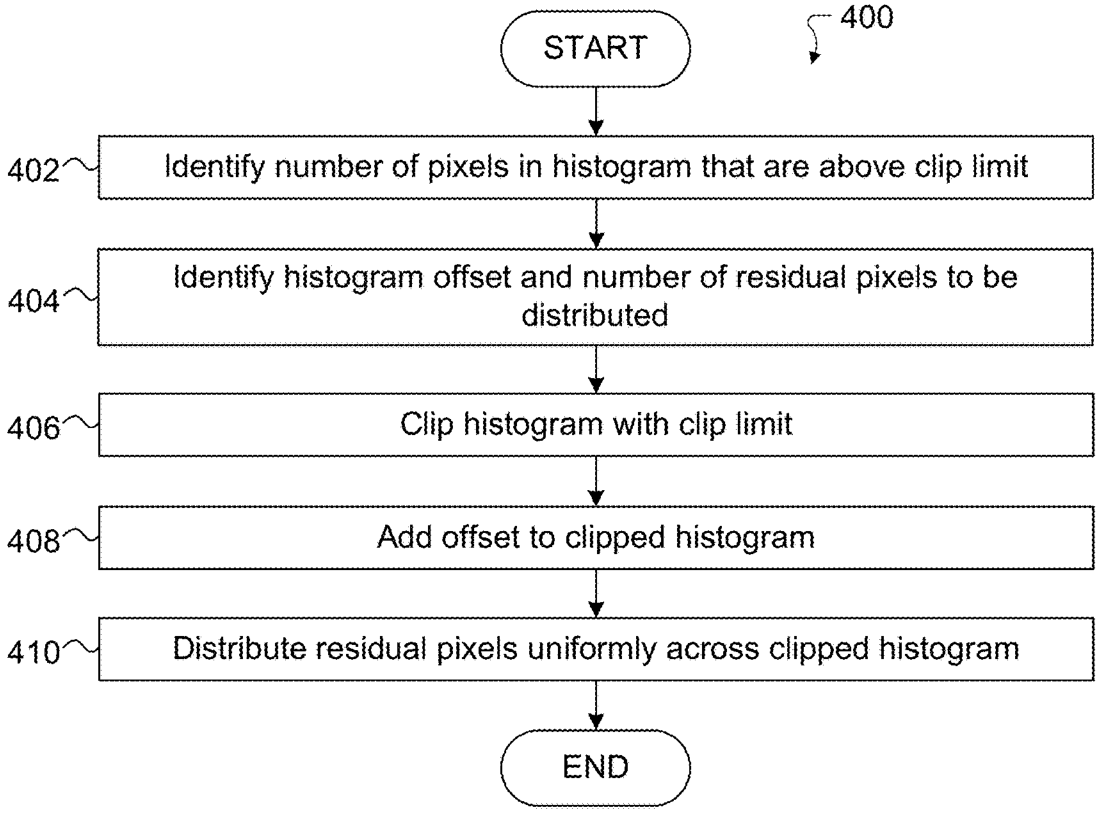
FIGS. 4A and 4B illustrate example operation of a histogram clipping function in the architecture of FIG. 3 and associated results in accordance with this disclosure.
Figure 4B:
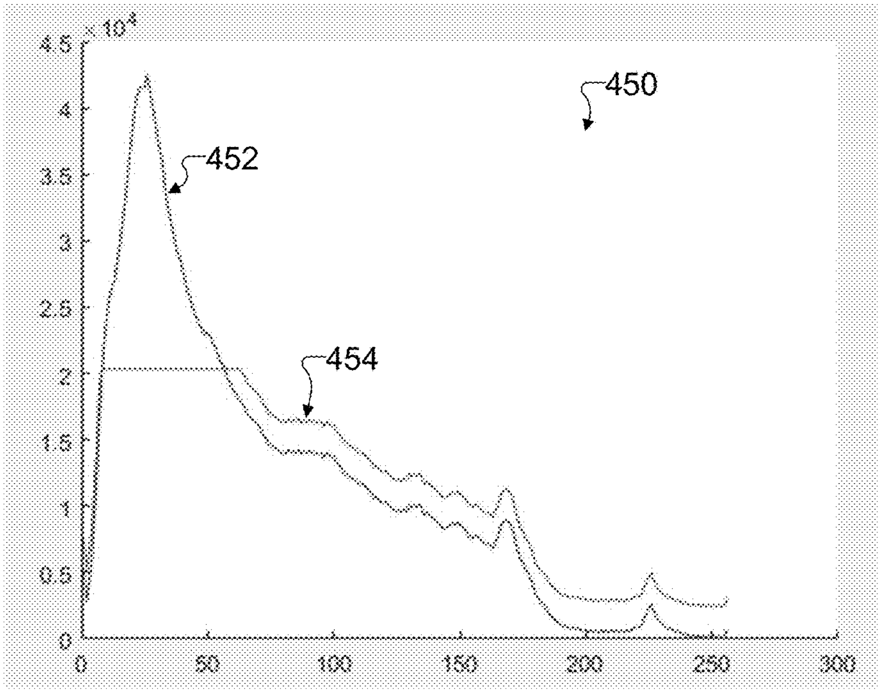
Figure 5A:
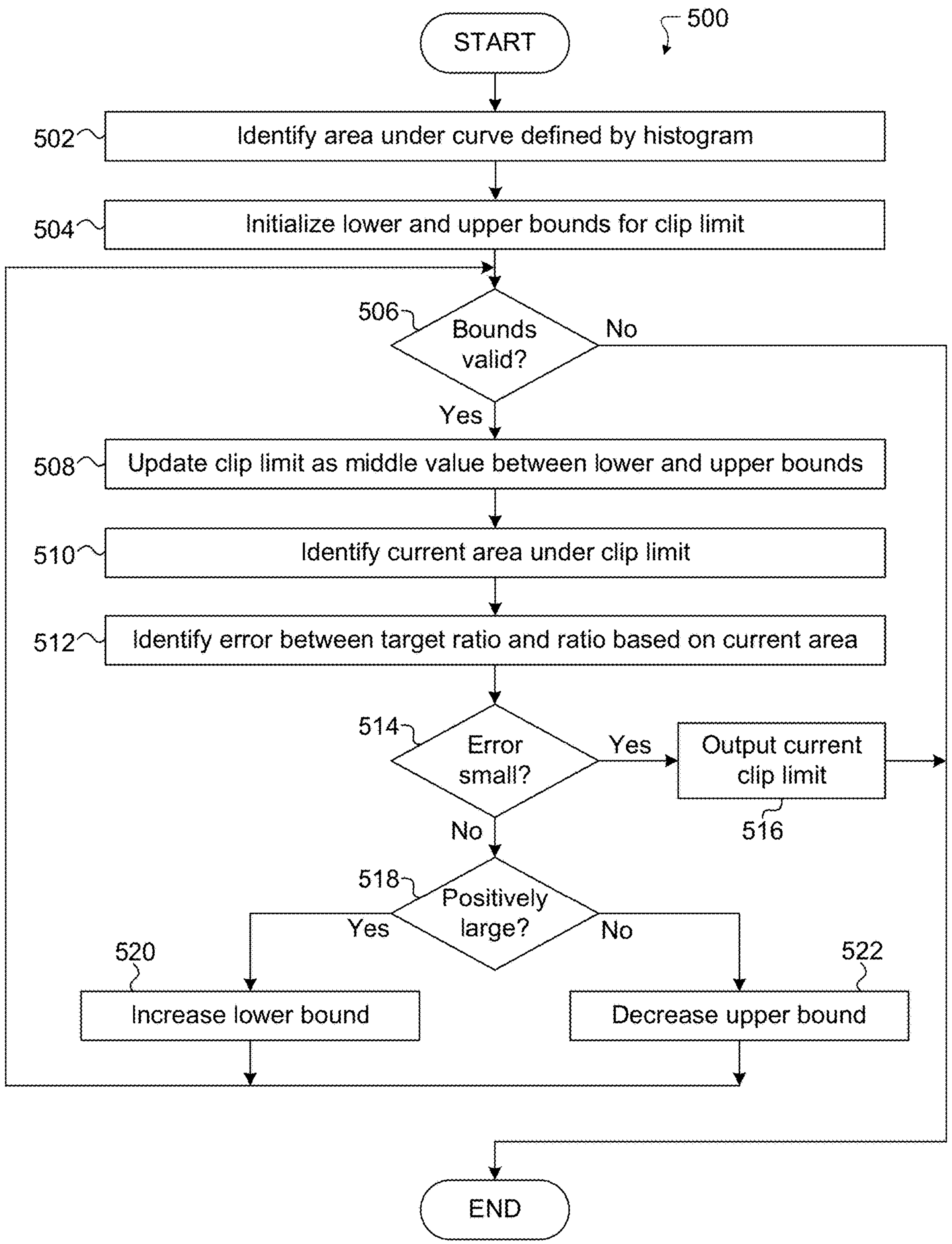
FIGS. 5A and 5B illustrate example operation of a clip limit initialization function in the architecture of FIG. 3 and associated results in accordance with this disclosure.
Figure 5B:
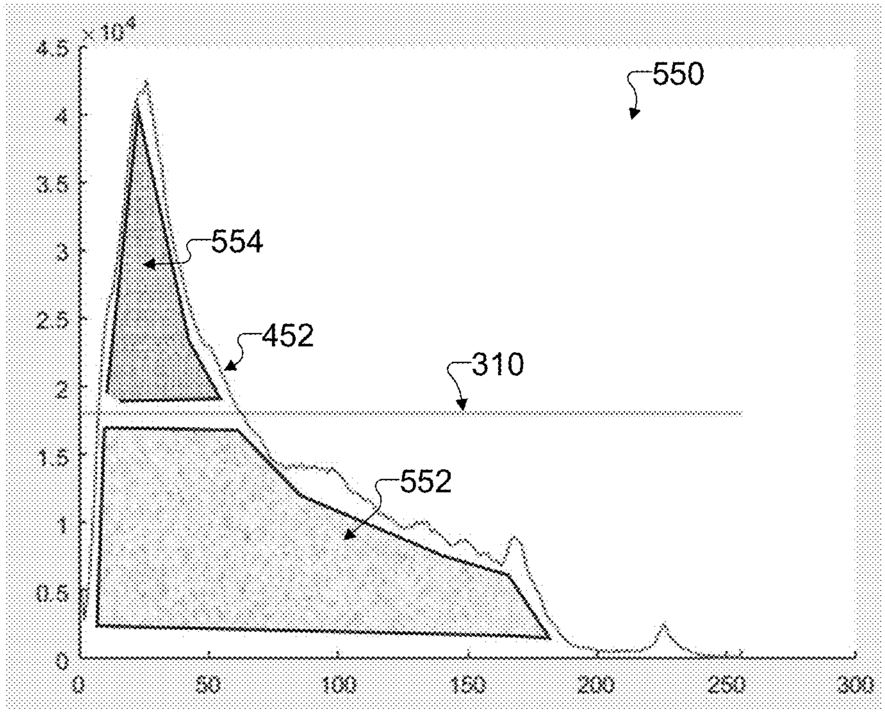

The histogram clipping function 312 can use any suitable technique(s) to clip an image histogram 306 based on a clip limit 310. One example process that may be performed by the histogram clipping function 312 is shown in FIGS. 4A and 4B, which are discussed below. The clip limit initialization function 308 can use any suitable technique(s) to identify a clip limit 310 to be applied to an image histogram 306. One example process that may be performed by the clip limit initialization function 308 is shown in FIGS. 5A and 5B, which are discussed below.

In some embodiments, the clip limit initialization function 308 can identify the clip limit 310 to be applied to an input image 302 based on a specified contrast strength 316. The contrast strength 316 identifies the strength or desired amount of contrast to be included in an output image being generated using the input image 302. The clip limit 310 can have a direct relation with the contrast strength 316 since (i) more contrast can be associated with an updated image histogram 314 having a larger range of values and (ii) less contrast can be associated with an updated image histogram 314 having a smaller range of values. Thus, larger amounts of clipping can reduce the range of values in an updated image histogram 314 more than smaller amounts of clipping. As a result, the clip limit 310 can be identified so that the resulting updated image histogram 314 generated by the histogram clipping function 312 provides the desired amount of contrast. The contrast strength 316 may be obtained in any suitable manner, such as by receiving the contrast strength 316 from a user of the electronic device 101 or by deriving a value of the contrast strength 316 based on one or more factors (such as one or more settings of the electronic device 101 and/or contents of the scene being imaged).

The updated image histogram 314 for each input image 302 is provided to a beta distribution-based transform generation function 318, which generally operates to process the updated image histogram 314 and generate an image transform 320 to be applied to the corresponding input image 302. An image transform application function 322 generally operates to receive each input image 302 and its associated image transform 320 and to apply the image transform 320 to the input image 302 in order to generate an associated locally-tone mapped image 210. For example, each image transform 320 may define an image transform curve to be applied to image data of the associated input image 302 in order to adjust the image data of the associated input image 302 and provide global tone mapping.

As described in more detail below, the beta distribution-based transform generation function 318 can identify an initial image transform based on an updated image histogram 314, identify specified beta coefficient values associated with a beta distribution, and update the initial image transform based on the specified beta coefficient values in order to generate an updated image transform. The updated image transform represents the image transform 320 to be applied by the image transform application function 322 to the input image 302. In some cases, the initial image transform based on the updated image histogram 314 may have a brightening effect or a darkening effect if applied to the input image 302, and the specified beta coefficient values can be selected to counteract the brightening or darkening effect. Also, in some cases, the specified beta coefficient values can be selected so that the image transform 320 remains within a specified range of an identity transform. The image transform 320 may therefore provide contrast enhancement while reducing or minimizing brightness changes when applied to the input image 302.

The beta distribution-based transform generation function 318 can use any suitable technique(s) to generate beta distribution-based image transforms. Example processes that may be performed by the beta distribution-based transform generation function 318 are shown in FIGS. 6A through 8B, which are discussed below. The image transform application function 322 can use any suitable technique (s) to apply image transforms 320 to input images 302.

Although FIG. 3 illustrates one example of an architecture 300 for beta distribution-based global tone mapping, various changes may be made to FIG. 3. For example, various components and functions in FIG. 3 may be combined, further subdivided, replicated, rearranged, or omitted according to particular needs. Also, one or more additional components and functions may be included in FIG. 3 if needed or desired.

FIGS. 4A and 4B illustrate example operation of the histogram clipping function 312 in the architecture 300 of FIG. 3 and associated results in accordance with this disclosure. As shown in FIG. 4A, a process 400 represents how the histogram clipping function 312 may operate to clip an image histogram 306 and generate an updated image histogram 314 based on a clip limit 310. In this example, a number of pixels in an image histogram that are above a clip limit are identified at step 402. This may include, for example, the processor 120 of the electronic device 101 identifying the number of pixels contained in an image histogram 306 that are above a clip limit 310, which may be received from the clip limit initialization function 308. As a particular example, this may include the processor 120 of the electronic device 101 using the following equation to identify the number of pixels.

$$totalExcess = \text{sum}(\max(\text{histogram} - clipLimit,\ 0))$$

Here, clipLimit represents the clip limit 310 determined for an input image 302, histogram represents the values in different bins of the image histogram 306 for that input image 302, and totalExcess represents the total number of pixels in that image histogram 306 above the clip limit 310.

A histogram offset and a number of residual pixels to be distributed are identified at step 404. This may include, for example, the processor 120 of the electronic device 101 identifying the histogram offset as the offset resulting from uniformly-distributing any clipped pixels in a batch, which can effectively raise the values in other bins of the image histogram 306 being processed. This may also include the processor 120 of the electronic device 101 identifying the number of residual pixels that will need to be redistributed as a result of exceeding the clip limit 310. As a particular example, this may include the processor 120 of the electronic device 101 using the following equations to identify the histogram offset and the number of residual pixels.

$$redistBatch = \text{floor}(totalExcess/nBin)$$

$$\text{residual} = \text{residual} + totalExcess - redistBatch * nBin$$

Here, nBin represents the total number of bins in the image histogram 306 (which in some cases may equal 256), redistBatch represents the histogram offset, and residual represents the number of residual pixels that will need to be redistributed.

The image histogram is clipped using the clip limit to generate a clipped histogram at step 406. This may include, for example, the processor 120 of the electronic device 101 lowering any values in the image histogram 306 that exceed the clip limit 310, such as by making those values equal to the clip limit 310. As a particular example, this may include the processor 120 of the electronic device 101 using the following equation to clip the image histogram 306.

$$\text{histogram} = \min(clipLimit, \text{histogram})$$

The histogram offset due to the batch distribution of the clipped pixels is added to the clipped histogram at step 408. This may include, for example, the processor 120 of the electronic device 101 adding the previously-determined histogram offset to the values in the clipped histogram. As a particular example, this may include the processor 120 of the electronic device 101 using the following equation to add the histogram offset.

$$\text{histogram} = \text{histogram} + redistBatch$$

The residual pixels are distributed uniformly across the clipped histogram at step 410. This may include, for example, the processor 120 of the electronic device 101 distributing the remaining residual pixels one-bin-at-a-time uniformly across all of the histogram bins of the clipped histogram. This results in the generation of an updated image histogram 314.

As shown in FIG. 4B, a chart 450 includes a line 452 defined by an example image histogram 306 and a line 454 defined by an example updated image histogram 314. As can be seen here, the clip limit 310 has been set to a value around $2.0\times10^4$, and the updated image histogram 314 does not exceed this clip limit. Pixels exceeding the clip limit 310 in the image histogram 306 as defined by the line 452 can be redistributed into other histogram bins, the offset can be added, and the residual pixels can be distributed in order to generate the updated image histogram 314. This allows the updated image histogram 314 to generally follow the same pattern as the image histogram 306, except in the clipped region where the updated image histogram 314 does not exceed the clip limit 310.

FIGS. 5A and 5B illustrate example operation of the clip limit initialization function 308 in the architecture 300 of FIG. 3 and associated results in accordance with this disclosure. As shown in FIG. 5A, a process 500 represents how the clip limit initialization function 308 may operate to identify a clip limit 310 for an input image 302 based on the image histogram 306 of that input image 302. In some cases, the clip limit 310 can also be based on the specified contrast strength 316.

In this example, an area under a curve defined by an image histogram is identified at step 502. This may include, for example, the processor 120 of the electronic device 101 identifying the area under the curve defined by the image histogram 306. In some cases, the area under the curve defined by the image histogram 306 can be denoted as areaMax. Lower and upper bounds for the clip limit are identified at step 504. This may include, for example, the processor 120 of the electronic device 101 setting a lower bound of the clip limit 310 to a minimum value or other initial lower value and setting an upper bound of the clip limit 310 to a maximum value or other initial higher value. As a particular example, this may include the processor 120 of the electronic device 101 using the following equations to initialize the lower and upper bounds.

$$clipLimitL = 0$$

-continued $$clipLimitH = \max(\text{histogram})$$

Here, clipLimitL represents the lower bound, and clipLimitH represents the upper bound.

A determination is made whether the lower and upper bounds are valid at step 506. This may include, for example, the processor 120 of the electronic device 101 determining whether the current values for the lower and upper bounds of the clip limit 310 enable a valid clip limit 310 to be identified. As a particular example, this may include the processor 120 of the electronic device 101 determining if the following condition for the lower and upper bounds is met.

$$clipLimitL < clipLimitH - 1$$

If the bounds are not valid, the process 500 can end. If the bounds are valid, the clip limit is updated to be equal to the middle value or other value between the lower and upper bounds at step 508. This may include, for example, the processor 120 of the electronic device 101 determining the average of the upper and lower bounds and using the average value as the current value of the clip limit 310. As a particular example, this may include the processor 120 of the electronic device 101 using the following equation to update the clip limit 310.

$$clipLimit = (clipLimitL + clipLimitH)/2$$

The area under the current value of the clip limit is determined at step 510. This may include, for example, the processor 120 of the electronic device 101 determining the area (which is under the curve defined by the image histogram 306) that is also under the current value of the clip limit 310. As a particular example, this may include the processor 120 of the electronic device 101 using the following equation to identify the area under the current value of the clip limit 310.

$$areaClipLimit = \text{Area Under } \min(clipLimit, \text{Histogram})$$

An error between (i) a target ratio and (ii) a ratio based on at least the area under the current value of the clip limit is identified at step 512. This may include, for example, the processor 120 of the electronic device 101 determining a target ratio based on the specified contrast strength 316. This may also include the processor 120 of the electronic device 101 determining a ratio involving (i) the area under the current value of the clip limit 310 and (ii) the total area areaMax under the curve defined by the image histogram 306 or the area above the current value of the clip limit 310. A difference between the two ratios is associated with the error of the current value of the clip limit 310. As a particular example, this may include the processor 120 of the electronic device 101 using the following equation to identify the error.

$$errorArea = area\text{Max} * \text{Contrast\_Strength} - areaClipLimit$$

Here, errorArea represents the error, which is expressed as an area difference.

A determination is made whether the identified error is small at step 514. This may include, for example, the processor 120 of the electronic device 101 comparing the determined error to a threshold value. As a particular example, this may include the processor 120 of the electronic device 101 using the following equation to determine whether the identified error is suitably small.

$$\text{Abs}(errorArea) < nBin$$

If the error is suitably small, the current value of the clip limit can be output at step 516. This may include, for example, the processor 120 of the electronic device 101 providing the current value of the clip limit 310 to the histogram clipping function 312.

Otherwise, a determination is made whether the error is positively large at step 518. This may include, for example, the processor 120 of the electronic device 101 determining whether the excessive error is based on the area under the current value of the clip limit 310 being too small (positively large) or too large (negatively large). As a particular example, this may include the processor 120 of the electronic device 101 determining if the following condition associated with the error is met.

$$errorArea > 0$$

Depending on the determination, the lower bound of the clip limit is increased at step 520, or the upper bound of the clip limit is decreased at step 522. This may include, for example, the processor 120 of the electronic device 101 moving one of the lower or upper bound towards the current value of the clip limit 310 or setting one of the lower or upper bound equal to the current value of the clip limit 310. As a particular example, this may include the processor 120 of the electronic device 101 using one of the following equations to modify the appropriate bound.

$$clipLimitL = clipLimit \text{ [for positively large determination]}$$

$$clipLimitH = clipLimit \text{ [for negatively large determination]}$$

The process 500 can return to step 506 in order to perform another iteration with an updated range of possible values for the clip limit 310 as defined by the new set of lower and upper bounds.

The process 500 shown in FIGURE S effectively implements a binary search for the clip limit 310, where the possible values for the clip limit 310 are cut roughly in half during each iteration through the process 500. Ideally, the binary search continues until a suitable value for the clip limit 310 is identified, where that value of the clip limit 310 achieves the target ratio. For example, as shown in FIG. 5B, a chart 550 includes the line 452 defined by an example image histogram 306, where a value of the clip limit 310 is identified by a horizontal line. Here, the clip limit 310 can separate the area under the line 452 into a lower area 552 and an upper area 554. Note that these areas 552 and 554 can be measured precisely or estimated, such as based on polygons that fit into these areas 552 and 554. A ratio can be defined based on one or more of these areas 552 and 554, such as (i) a ratio of the area 552 to the area 554 or (ii) a ratio of the area 554 to areaMax (which is the total of both areas 552 and 554). If the determined ratio is not suitably close to the target ratio, the value of the clip limit 310 can be raised or lowered to adjust the areas 552 and 554. In some cases, the target ratio to be obtained may be based on the specified contrast strength 316, and the clip limit 310 can be adjusted until the target ratio is obtained. As a particular example, the contrast strength 316 may result in a target ratio of 80:20, meaning the area 552 should represent 80% of the area under the line 452. Thus, the process 500 can be used to identify a value of the clip limit 310 that allows a ratio involving the area(s) 552, 554 to meet the target ratio, at least to within some specified threshold.

Figure 6A:
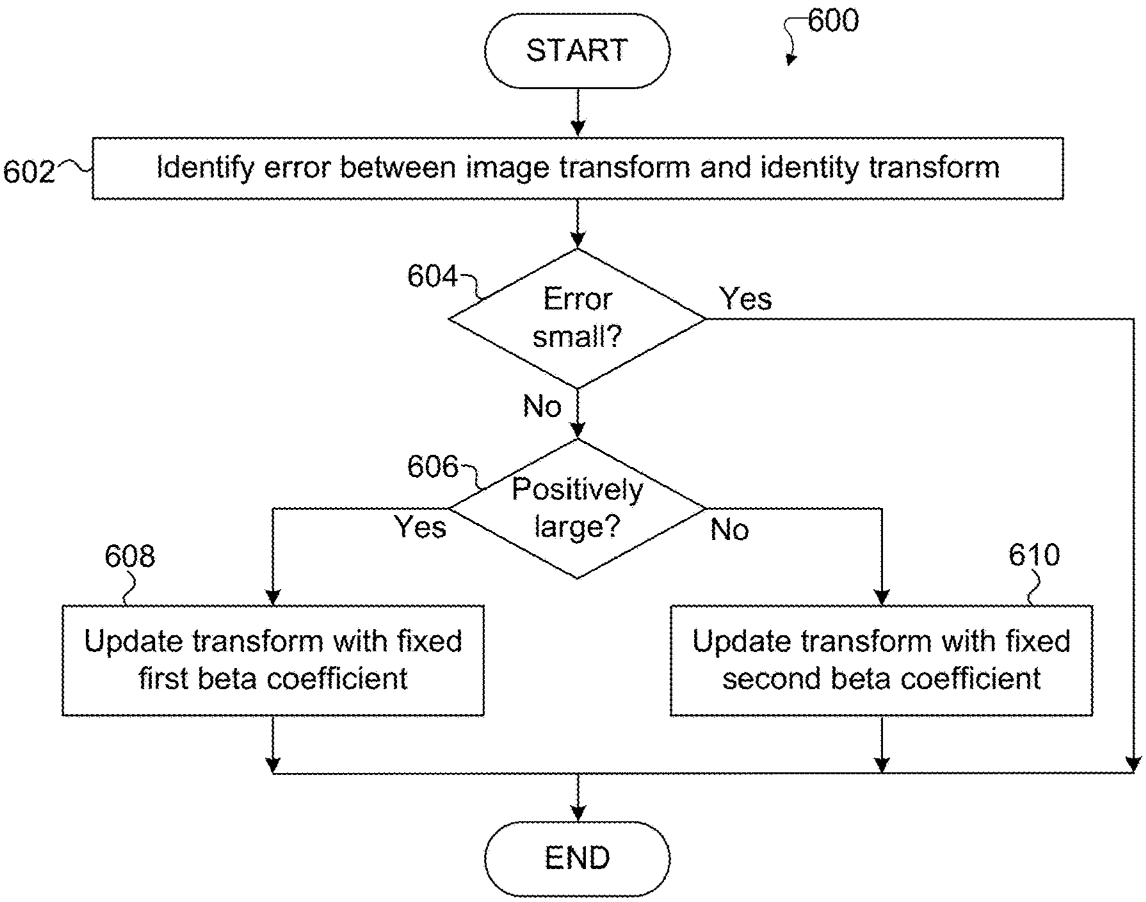
FIGS. 6A through 8B illustrate example operations of a beta distribution-based transform generation function in the architecture of FIG. 3 and associated results in accordance with this disclosure.
Figure 6B:
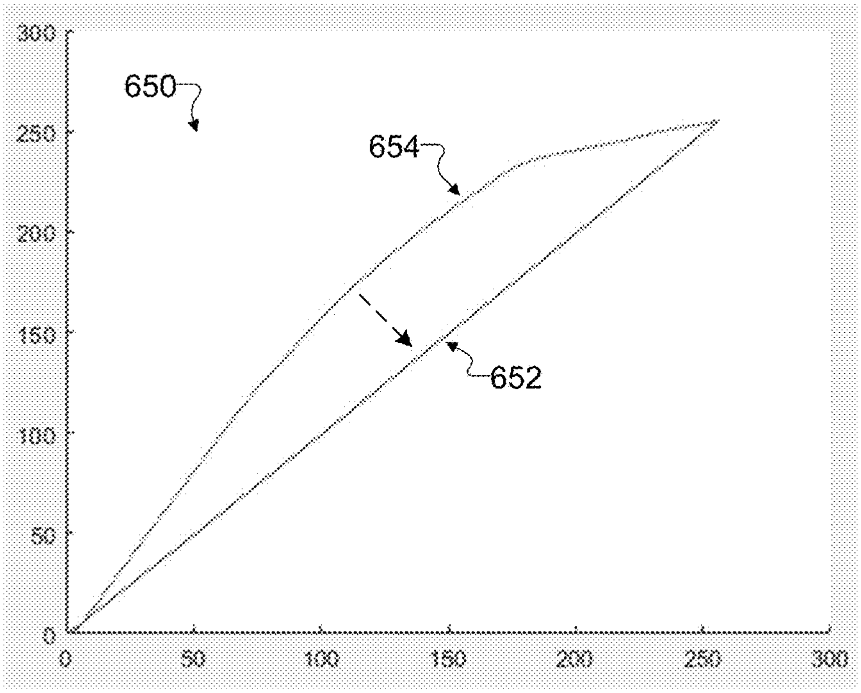
Figure 7A:
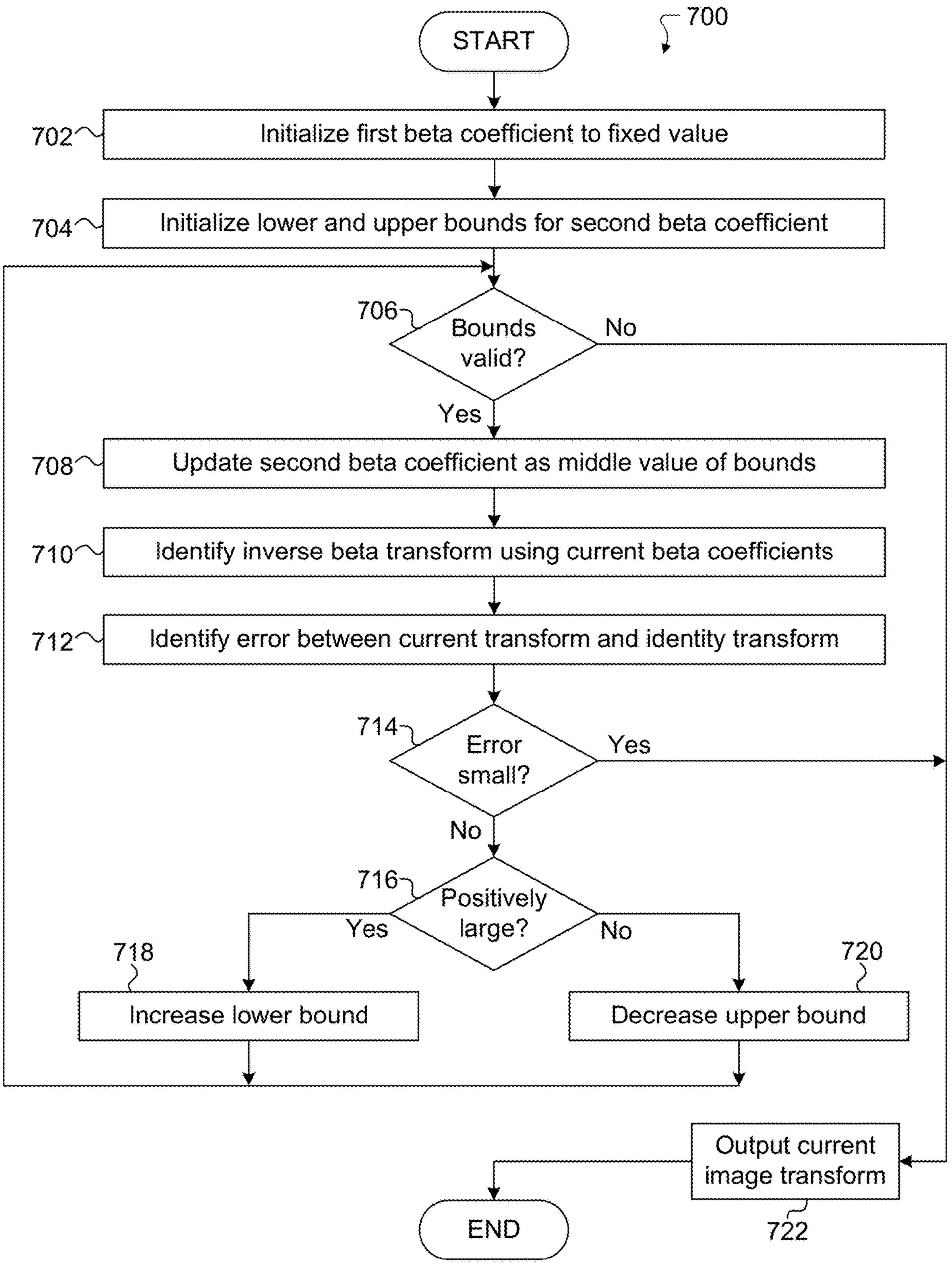
Figure 7B:
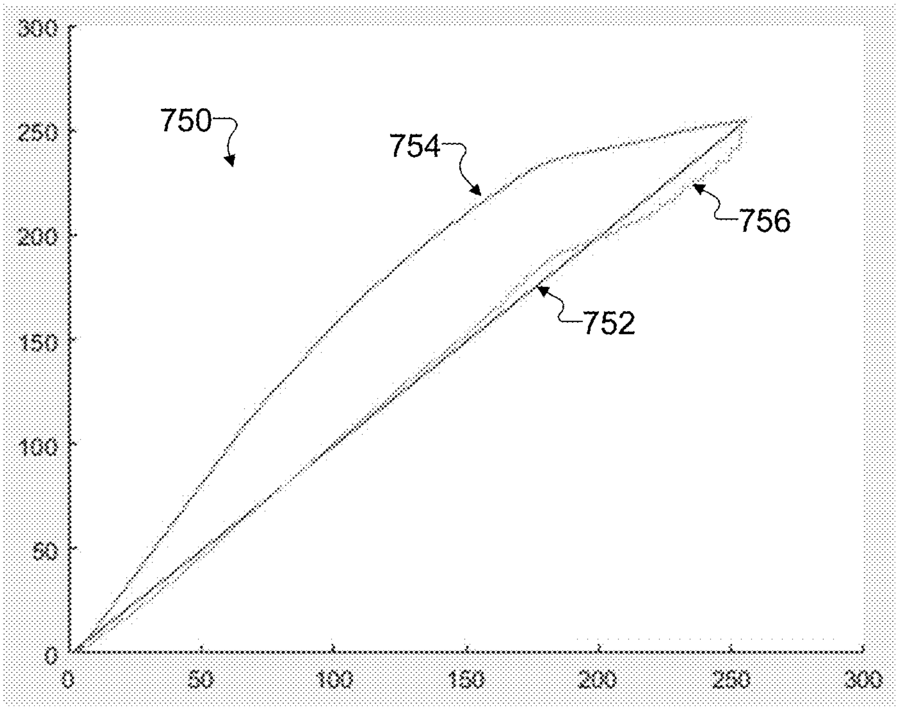
Figure 8A:
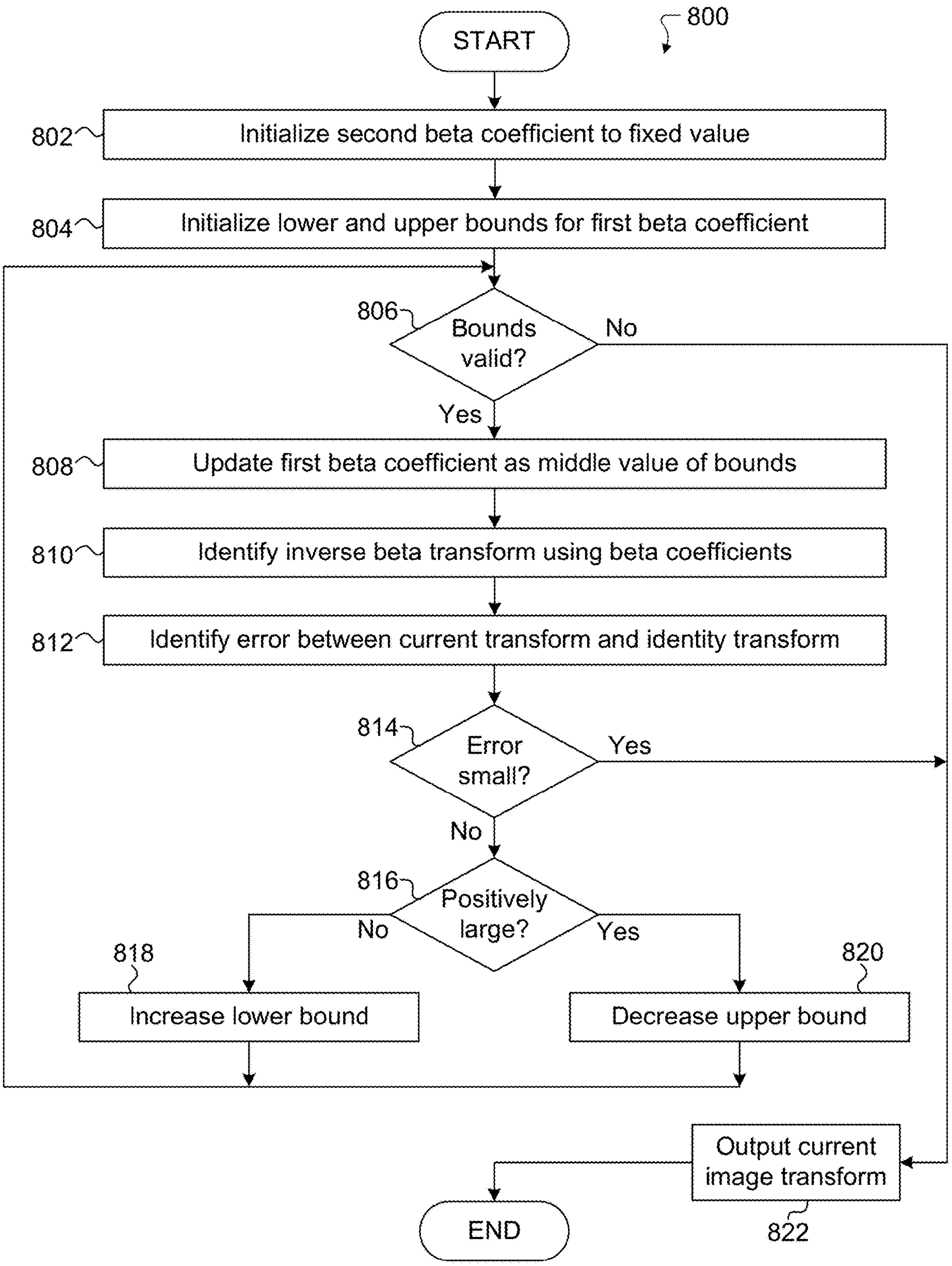
Figure 8B:
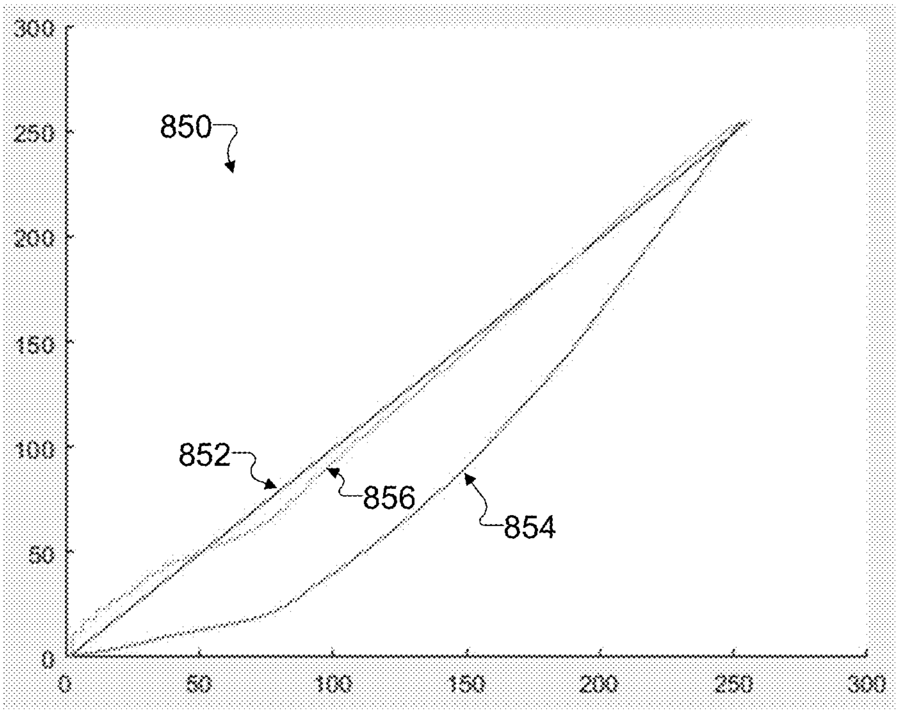

FIGS. 6A through 8B illustrate example operations of the beta distribution-based transform generation function 318 in the architecture 300 of FIG. 3 and associated results in accordance with this disclosure. In particular, FIGS. 6A and 6B illustrate how the beta distribution-based transform generation function 318 may determine which of two beta coefficient values can be updated given an updated image histogram 314, FIGS. 7A and 7B illustrate how one of the two beta coefficient values may be updated, and FIGS. 8A and 8B illustrate how another of the two beta coefficient values may be updated.

As shown in FIG. 6A, a process 600 represents how the beta distribution-based transform generation function 318 elects which beta coefficient value should be fixed and which beta coefficient value should be adjusted. In this example, an error between an initial image transform and an identity transform is identified at step 602. This may include, for example, the processor 120 of the electronic device 101 comparing an initial image transform that is generated based on an updated image histogram 314 to an identity transform, where the identity transform represents an image transform that returns image data unchanged. This may also include the processor 120 of the electronic device 101 averaging differences between the initial image transform and the identity transform. As a particular example, this may include the processor 120 of the electronic device 101 using the following equation to determine the error between the initial image transform and the identity transform.

$$errorTransform = \text{sum}(\text{transform} - transformIdentity)/(nBin - 1)$$

Here, error Transform represents the determined error between the initial image transform and the identity transform, transform represents the initial image transform, and transformIdentity represents the identity transform. In some cases, the identity transform may be defined as follows.

$$TransformIdentity = [0{:}1{:}\ nBin - 1]$$

In some embodiments, the initial image transform may be defined as a uniform distribution transform of the updated image histogram 314, where the uniform distribution transform can be defined as the cumulative distribution function (CDF) of the updated image histogram 314.

A determination is made whether the identified error is small at step 604. This may include, for example, the processor 120 of the electronic device 101 comparing the determined error to a threshold value. As a particular example, this may include the processor 120 of the electronic device 101 using the following equation to determine whether the identified error is suitably small.

$$\text{Abs}(errorTransform) \leq ToleranceTransform$$

Here, ToleranceTransform represents the threshold value. In some cases, the value of Tolerance Transform may have a value of 10. If the error is suitably small, no modifications may need to be made to the initial image transform, and the process 600 ends. In this case, the initial image transform may be used as the image transform 320 since the initial image transform is already adequately similar to the identity transform.

Otherwise, a determination is made whether the identified error is positively large at step 606. This may include, for example, the processor 120 of the electronic device 101 determining whether the excessive error is based on the initial image transform being excessively above (positively large) or excessively below (negatively large) the identity transform. As a particular example, this may include the processor 120 of the electronic device 101 determining if the following condition associated with the error is met.

$$errorTransform > 0$$

Depending on the determination, the image transform is either updated with a fixed first beta coefficient at step 608 or updated with a fixed second beta coefficient at step 610. FIGS. 7A and 7B illustrate how step 608 may occur, and FIGS. 8A and 8B illustrate how step 610 may occur.

As shown in FIG. 6B, a chart 650 includes a line 652 that represents the identity transform and a line 654 that represents the initial image transform. As can be seen in this example, the line 654 is predominantly above the line 652, which indicates that the initial image transform would have a brightening effect if applied to an input image 302. As a result, the initial image transform can be updated in step 608 to generate an updated image transform that is closer to the line 652. Note that if the line 654 is predominantly below the line 652, this indicates that the initial image transform would have a darkening effect if applied to an input image 302. As a result, the initial image transform can be updated in step 610 to generate an updated image transform that is closer to the line 652. As described below, fixing the value of the first beta coefficient can provide a darkening effect to a brightening image transform, and fixing the value of the second beta coefficient can provide a brightening effect to a darkening image transform.

FIGS. 7A and 7B illustrate an example update of a beta distribution by the beta distribution-based transform generation function 318 and associated results. As shown in FIG. 7A, a process 700 represents how the beta distribution-based transform generation function 318 may update the beta coefficient values during step 608 in FIG. 6A. A beta distribution is a non-uniform distribution that is generally defined using a beta cumulative distribution function, where the beta cumulative distribution function is defined using two beta coefficients (which are denoted as having two beta coefficient values). Setting the first and second beta coefficients to specified values defines the shape of the beta distribution, and altering one or both of the first and second beta coefficients changes the shape of the beta distribution.

In this example, a first beta coefficient is initialized to a fixed value at step 702, and lower and upper bounds for a second beta coefficient are initialized at step 704. This may include, for example, the processor 120 of the electronic device 101 setting the first beta coefficient to a predefined fixed value. This may also include the processor 120 of the electronic device 101 setting a lower bound of the second beta coefficient to a minimum value or other initial lower value and setting an upper bound of the second beta coefficient to a maximum value or other initial higher value. As a particular example, this may include the processor 120 of the electronic device 101 using the following equations to initialize the first beta coefficient and the bounds of the second beta coefficient.

$$A = betaCoef$$

$$BL = 0.5$$

$$BH = 5.0$$

Here, A represents the first beta coefficient, and betaCoef represents the fixed value of the first beta coefficient. Also, BL and BH respectively represent the lower and upper bounds of the second beta coefficient (which is denoted B).

A determination is made whether the lower and upper bounds are valid at step 706. This may include, for example, the processor 120 of the electronic device 101 determining whether the current values for the lower and upper bounds of the second beta coefficient enable a valid second beta coefficient value to be identified. As a particular example, this may include the processor 120 of the electronic device 101 determining if the following condition for the lower and upper bounds is met.

$$BL < BH - ToleranceCoef$$

Here, ToleranceCoef represents a tolerance value that prevents the lower bound from being too close to the upper bound. In some embodiments, ToleranceCoef may have a value of 0.02. If the bounds are not valid, the current version of the image transform can be output at step 722. This may include, for example, the processor 120 of the electronic device 101 providing the current version of the image transform as the image transform 320 to the image transform application function 322.

If the bounds are valid, the second beta coefficient is updated to be equal to the middle value or other value between the lower and upper bounds at step 708. This may include, for example, the processor 120 of the electronic device 101 determining the average of the upper and lower bounds and using the average value as the current value of the second beta coefficient. As a particular example, this may include the processor 120 of the electronic device 101 using the following equation to update the second beta coefficient.

$$B = (BL + BH)/2$$

An inverse beta transform is identified using the current beta coefficients at step 710. This may include, for example, the processor 120 of the electronic device 101 determining the inverse beta transform using the fixed value of the first beta coefficient and the current value of the second beta coefficient. The inverse beta transform can be defined using an inverse of the beta cumulative distribution function. As a particular example, this may include the processor 120 of the electronic device 101 using the following equation to identify the inverse beta transform.

$$\text{transform2} = betainv(\text{transform}/(nBin-1), A, B) * (nBin-1)$$

Here, transform 2 represents the inverse beta transform, and Betainv represents the inverse of the beta cumulative distribution function.

An error between the current transform and the identity transform is identified at step 712. This may include, for example, the processor 120 of the electronic device 101 determining the average difference between the inverse beta transform and the identity transform. As a particular example, this may include the processor 120 of the electronic device 101 using the following equation to identify the error between the current transform and the identity transform.

$$errorTransform2 = \text{sum}(\text{transform2} - transformIdentity)/(nBin-1)$$

Here, errorTransform2 represents the error between the current transform and the identity transform.

A determination is made whether the identified error is small at step 714. This may include, for example, the processor 120 of the electronic device 101 comparing the determined error to a threshold value. As a particular example, this may include the processor 120 of the electronic device 101 using the following equation to determine whether the identified error is suitably small.

$$\text{Abs}(errorTransform2) \leq ToleranceTransform$$

If the error is suitably small, the current version of the image transform can be output at step 722.

Otherwise, a determination is made whether the error is positively large at step 716. This may include, for example, the processor 120 of the electronic device 101 determining whether the excessive error is based on the current image transform being excessively above (positively large) or excessively below (negatively large) the identity transform. As a particular example, this may include the processor 120 of the electronic device 101 determining if the following condition associated with the error is met.

$$errorTransform2 > 0$$

Depending on the determination, the lower bound of the second beta coefficient is increased at step 718, or the upper bound of the second beta coefficient is decreased at step 720. This may include, for example, the processor 120 of the electronic device 101 moving one of the lower or upper bound towards the current value of the second beta coefficient or setting one of the lower or upper bound equal to the current value of the second beta coefficient. As a particular example, this may include the processor 120 of the electronic device 101 using one of the following equations to modify the appropriate bound.

$$BL = B \text{ [for positively large determination]}$$

$$BH = B \text{ [for negatively large determination]}$$

The process can return to step 706 in order to perform another iteration with an updated range of possible values for the second beta coefficient value as defined by the new set of lower and upper bounds.

The process 700 shown in FIG. 7A effectively implements a binary search for the second beta coefficient value, where the possible values for the second beta coefficient are cut roughly in half during each iteration through the process 700. Ideally, the binary search continues until a suitable value for the second beta coefficient is identified, where that second beta coefficient value achieves a desired updated image transform. For example, as shown in FIG. 7B, a chart 750 includes a line 752 that represents the identity transform, a line 754 that represents an initial image transform, and a line 756 that represents an updated image transform. As can be seen in this example, while the line 754 is predominantly above the line 752, the line 756 can (on average) be centered at or near the line 754. This indicates that the second beta coefficient value has been selected so that the average difference of the updated image transform represented by the line 756 from the identity transform represented by the line 752 is at or close to zero. As a result, the updated image transform may only or primarily cause contrast enhancements and not brightness changes when applied to an input image 302.

FIGS. 8A and 8B illustrate another example update of a beta distribution by the beta distribution-based transform generation function 318 and associated results. As shown in FIG. 8A, a process 800 represents how the beta distribution-based transform generation function 318 may update the beta coefficient values during step 610 in FIG. 6A. Note that steps 802-822 shown in FIGURE SA are quite similar to steps 702-722 shown in FIG. 7A described above. However, the first and second beta coefficients have been reversed here. Thus, the second beta coefficient has a fixed value, and lower and upper bounds are identified for the first beta coefficient and are used to identify a value for the first beta coefficient. Also, the "yes" and "no" paths for step 816 are reversed relative to the paths in FIG. 7A. As a result, a negatively large error can result in an increase in the lower bound of the first beta coefficient, and a positively large error can result in a decrease in the lower bound of the first beta coefficient. Otherwise, the description of FIG. 7A above applies equally to FIG. 8A.

The process 800 shown in FIG. 8A effectively implements a binary search for the first beta coefficient value, where the possible values for the first beta coefficient are cut roughly in half during each iteration through the process 800. Ideally, the binary search continues until a suitable value for the first beta coefficient is identified, where that first beta coefficient value achieves a desired updated image transform. For example, as shown in FIG. 8B, a chart 850 includes a line 852 that represents the identity transform, a line 854 that represents an initial image transform, and a line 856 that represents an updated image transform. As can be seen in this example, while the line 854 is predominantly below the line 852, the line 856 can (on average) be centered at or near the line 854. This indicates that the first beta coefficient value has been selected so that the average difference of the updated image transform represented by the line 856 from the identity transform represented by the line 852 is at or close to zero. As a result, the updated image transform again may only or primarily cause contrast enhancements and not brightness changes when applied to an input image 302.

Although FIGS. 4A through 8B illustrate examples of operations of various functions in the architecture 300 of FIG. 3 and associated results, various changes may be made to FIGS. 4A through 8B. For example, while shown as a series of steps, various steps in each of FIGS. 4A, 5A, 6A, 7A, and 8A may overlap, occur in parallel, occur in a different order, or occur any number of times (including zero times). Also, the example results shown in FIGS. 4B, 5B, 6B, 7B, and 8B are for illustration and explanation only and do not limit the scope of this disclosure to the specific types of results shown here.

In the above description, it has often been assumed that an image transform can be adjusted so that there is zero or close-to-zero average differences between the resulting updated image transform and the identity transform. However, this may allow the updated image transform to vary above and below the identity transform by relatively large amounts, as long as the resulting updated image transform would have an average difference of zero or approximately zero. This might allow an undesirable amount of contrast to exist in some circumstances.

Figure 9:
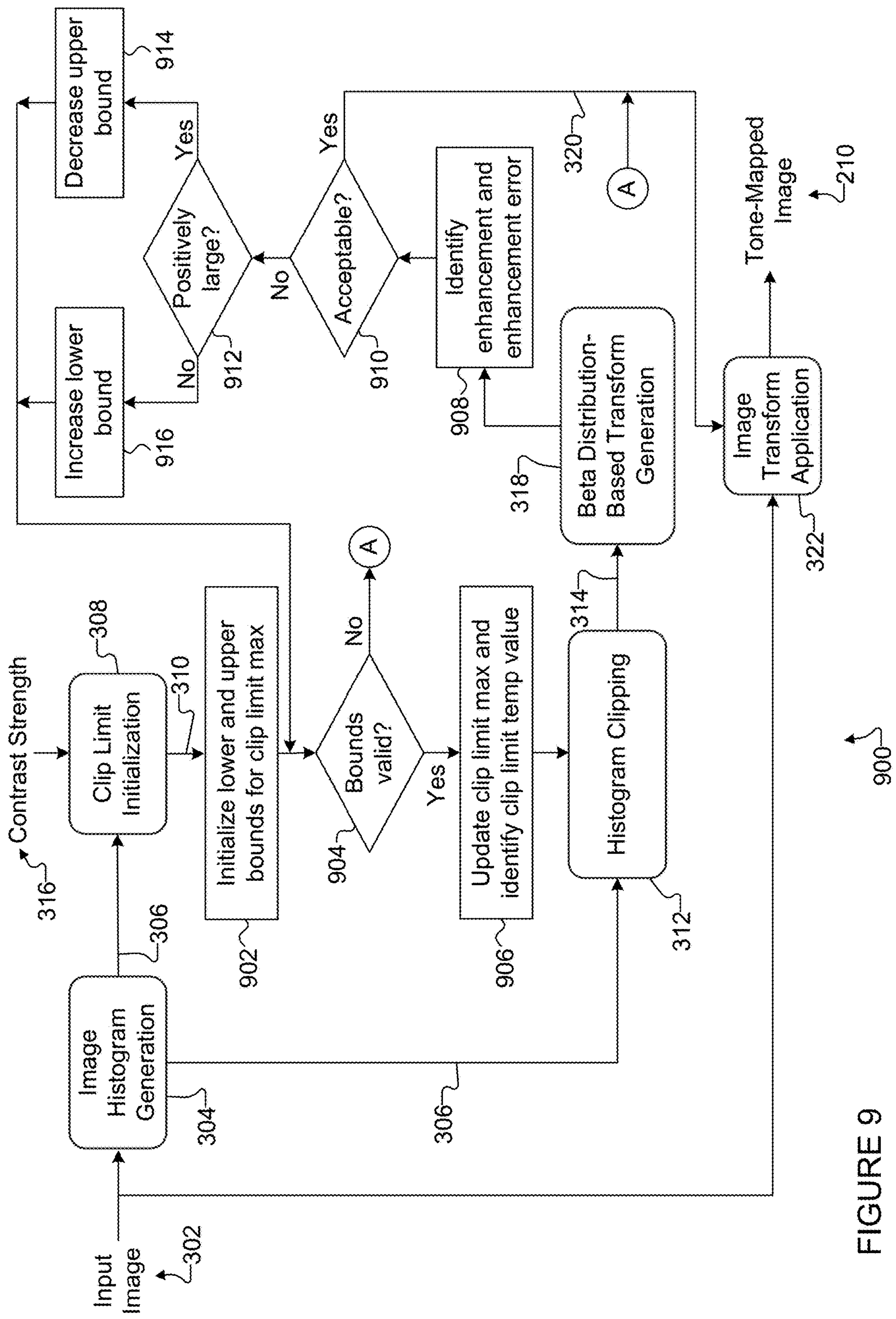
FIG. 9 illustrates an example architecture for contrast-enhanced beta distribution-based global tone mapping in accordance with this disclosure.

FIG. 9 illustrates an example architecture 900 for contrast-enhanced beta distribution-based global tone mapping in accordance with this disclosure. Among other things, the architecture 900 may solve the issue of an undesirable amount of contrast being created. For ease of explanation, the architecture 900 shown in FIG. 9 is described as being used by the global tone mapping operation 212 in the pipeline 200 shown in FIG. 2, which may be implemented on or supported by the electronic device 101 in the network configuration 100 of FIG. 1. However, the architecture 900 shown in FIG. 9 could be used with any other suitable device(s) and pipeline(s) and in any other suitable system(s), such as when the architecture 900 is implemented on or supported by the server 106.

As shown in FIG. 9, the architecture 900 is similar to the architecture 300 shown in FIG. 3 and includes various components described above. In this example, however, the architecture 900 attempts to limit variations in the updated image transform above and below the identity transform, which can reduce swings in the updated image transform used as the image transform 320 so that lower contrast can be achieved. In FIG. 9, this is accomplished by processing the clip limit 310 generated by the clip limit initialization function 308.

In this example, lower and upper bounds for a maximum value of the clip limit 310 (referred to as a "clip limit max") are initialized at step 902. This may include, for example, the processor 120 of the electronic device 101 setting a lower bound of the clip limit max to a minimum value or other initial lower value and setting an upper bound of the clip limit max to a maximum value or other initial higher value. As a particular example, this may include the processor 120 of the electronic device 101 using the following equations to initialize the lower and upper bounds.

$$clipLimitMaxL = 0$$

-continued $$clipLimitMaxH = \max(\text{histogram})$$

Here, clipLimitMaxL represents the lower bound, and clipLimitMaxH represents the upper bound.

A determination is made whether the lower and upper bounds are valid at step 904. This may include, for example, the processor 120 of the electronic device 101 determining whether the current values for the lower and upper bounds of the clip limit max enable a valid clip limit max to be identified. As a particular example, this may include the processor 120 of the electronic device 101 determining if the following condition for the lower and upper bounds is met.

$$clipLimitMaxL < clipLimitMaxH - 1$$

If the bounds are not valid, the image transform can be applied without further modifications of the clip limit 310.

If the bounds are valid, the clip limit max is updated and a temporary clip limit value is identified at step 906. This may include, for example, the processor 120 of the electronic device 101 setting the clip limit max to be equal to the middle value or other value between the lower and upper bounds, such as by determining the average of the upper and lower bounds and using the average value as the current value of the clip limit max. This may also include the processor 120 of the electronic device 101 calculating the temporary clip limit (denoted as cliplimitTmp below) by bounding the clip limit 310 with the current clip limit max. The histogram clipping function 312 may then clip the image histogram 306, and the resulting updated image histogram 314 can be used by the beta distribution-based transform generation function 318 to generate an updated image transform.

The updated image transform is used to identify an enhancement and an enhancement error associated with the updated image transform at step 908. This may include, for example, the processor 120 of the electronic device 101 identifying the enhancement as the maximum difference between the updated image transform and the identity transform. This may also include the processor 120 of the electronic device 101 identifying the enhancement error (denoted as errorEnh) of the updated image transform from a target (such as the identity transform). A determination is made whether one or both of the enhancement and the enhancement error are acceptable at step 910. This may include, for example, the processor 120 of the electronic device 101 determining whether the enhancement error is sufficiently small or whether the enhancement is already small for the current clip limit. As a particular example, this may include the processor 120 of the electronic device 101 using the following equation for determining if one or both of the enhancement and the enhancement error are acceptable $$\text{Abs}(errorEnh) < EnhTol \text{ OR } (errorEnh < 0 \;\&\&\; cliplimitTmp == clipLimit)$$

Here, EnhTol represents a threshold value for the enhancement error.

If either condition is met, the updated image transform can be used as the image transform 320 by the image transform application function 322. In this case, the image transform 320 can be used to perform beta distribution-based global tone mapping, which can have enhanced contrast. If neither condition is met, a determination is made whether the error is positively large at step 912. This may include, for example, the processor 120 of the electronic device 101 determining whether an excessive enhancement error is based on the updated image transform being excessively above or below the identity transform. As a particular example, this may include the processor 120 of the electronic device 101 determining if the following condition associated with the error is met.

$$errorEnh > 0$$

Depending on the determination, the upper bound of the clip limit max is decreased at step 914, or the lower bound of the clip limit max is increased at step 916. This may include, for example, the processor 120 of the electronic device 101 moving one of the lower or upper bound towards the current value of the clip limit max or setting one of the lower or upper bound equal to the current value of the clip limit max. As a particular example, this may include the processor 120 of the electronic device 101 using one of the following equations to modify the appropriate bound.

$$clipLimitMaxH = clipLimitMax \text{ [for positively large determination]}$$

$$clipLimitMaxL = clipLimitMax \text{ [for negatively large determination]}$$

The process can return to step 904 in order to perform another iteration with an updated range of possible values for the clip limit max as defined by the new set of lower and upper bounds.

Although FIG. 9 illustrates one example of an architecture 900 for contrast-enhanced beta distribution-based global tone mapping, various changes may be made to FIG. 9. For example, various components and functions in FIG. 9 may be combined, further subdivided, replicated, rearranged, or omitted according to particular needs. Also, one or more additional components and functions may be included in FIG. 9 if needed or desired.

Figure 10:
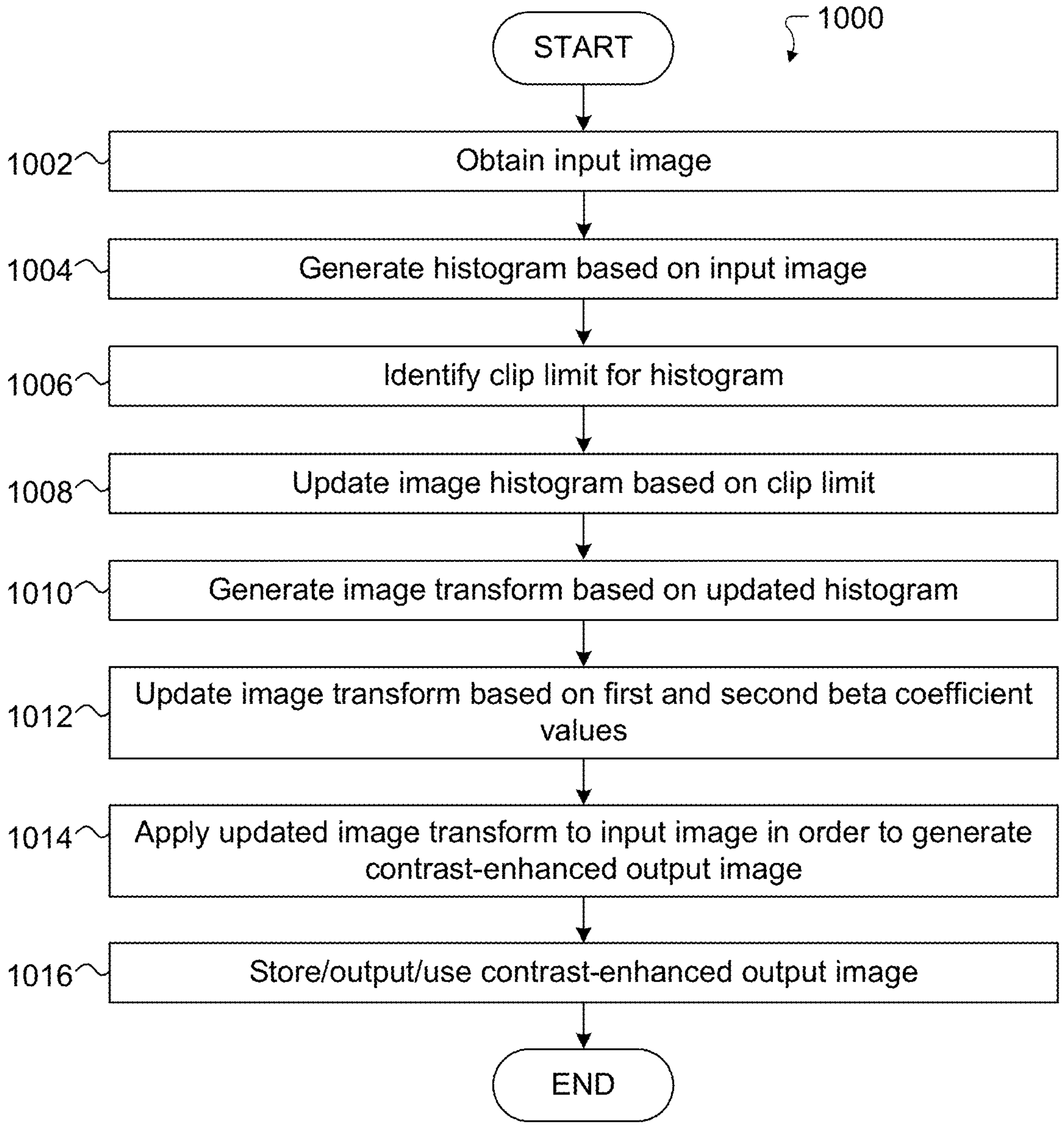
FIG. 10 illustrates an example method for beta distribution-based global tone mapping in accordance with this disclosure.

FIG. 10 illustrates an example method 1000 for beta distribution-based global tone mapping in accordance with this disclosure. For ease of explanation, the method 1000 shown in FIG. 10 is described as being performed by the electronic device 101 in the network configuration 100 of FIG. 1, where the electronic device 101 can implement the pipeline 200 shown in FIG. 2 and the architecture 300 or 900 shown in FIG. 3 or 9. However, the method 1000 shown in FIG. 10 could be performed by any other suitable device(s), pipeline(s), and architecture(s) and in any other suitable system(s), such as when the method 1000 is performed using the server 106.

As shown in FIG. 10, an input image is obtained at step 1002. This may include, for example, the processor 120 of the electronic device 101 obtaining an input image 302 that represents a locally-tone mapped image 210 generated by the local tone mapping operation 208 or a fused image 206 generated by the tone fusion operation 204 in the pipeline 200 of FIG. 2. The input image 302 may be generated by the electronic device 101 itself or obtained from an external source. An image histogram is generated based on the input image at step 1004. This may include, for example, the processor 120 of the electronic device 101 performing the image histogram generation function 304 to generate an image histogram 306 based on the contents of the input image 302.

A clip limit for the image histogram is identified at step 1006. This may include, for example, the processor 120 of the electronic device 101 performing the clip limit initialization function 308 to identify the clip limit 310 for the input image 302 based on the image histogram 306. In some cases, the clip limit 310 can be based on the specified contrast strength 316, such as when a value of the clip limit 310 is selected in order to separate an area under a curve defined by the image histogram 306 into a first area above the clip limit 310 and a second area below the clip limit 310. The clip limit 310 may be selected such that a ratio involving at least one of the areas satisfies or is based on the contrast strength 316. The image histogram is updated based the clip limit to generate an updated image histogram at step 1008. This may include, for example, the processor 120 of the electronic device 101 performing the histogram clipping function 312 to clip the image histogram 306 based on the clip limit 310 and generate an updated image histogram 314.

An image transform is generated based on the updated image histogram at step 1010 and updated based on first and second beta coefficient values in order to generate an updated image transform at step 1012. This may include, for example, the processor 120 of the electronic device 101 performing the beta distribution-based transform generation function 318 to generate the initial image transform based on a uniform distribution transform of the updated image histogram 314. This may also include the processor 120 of the electronic device 101 performing the beta distribution-based transform generation function 318 to determine whether the initial image transform would have a brightening effect or a darkening effect on the input image 302 (such as based on a comparison to an identity transform) and selecting the beta coefficient values to counteract the brightening or darkening effect. For example, the value of one beta coefficient can be fixed, and the value of the other beta coefficient can be selected so that the updated image transform remains within a specified range of the identity transform. The updated image transform can represent the image transform 320.

The updated image transform is applied to the input image in order to generate a contrast-enhanced output image at step 1014. This may include, for example, the processor 120 of the electronic device 101 performing the image transform application function 322 to apply the image transform 320 to the input image 302 in order to generate a tone-mapped image 214. The contrast-enhanced output image is stored, output, or used in some manner at step 1016. For example, the tone-mapped image 214 may be displayed on the display 160 of the electronic device 101, saved to a camera roll stored in a memory 130 of the electronic device 101, or attached to a text message, email, or other communication to be transmitted from the electronic device 101. Of course, the tone-mapped image 214 could be used in any other or additional manner.

Although FIG. 10 illustrates one example of a method 1000 for beta distribution-based global tone mapping, various changes may be made to FIG. 10. For example, while shown as a series of steps, various steps in FIG. 10 may overlap, occur in parallel, occur in a different order, or occur any number of times (including zero times). As particular examples, one or more pre-processing operations may be performed on the input image 302, and/or one or more post-processing operations may be performed on the tone-mapped image 214.

Figure 11:
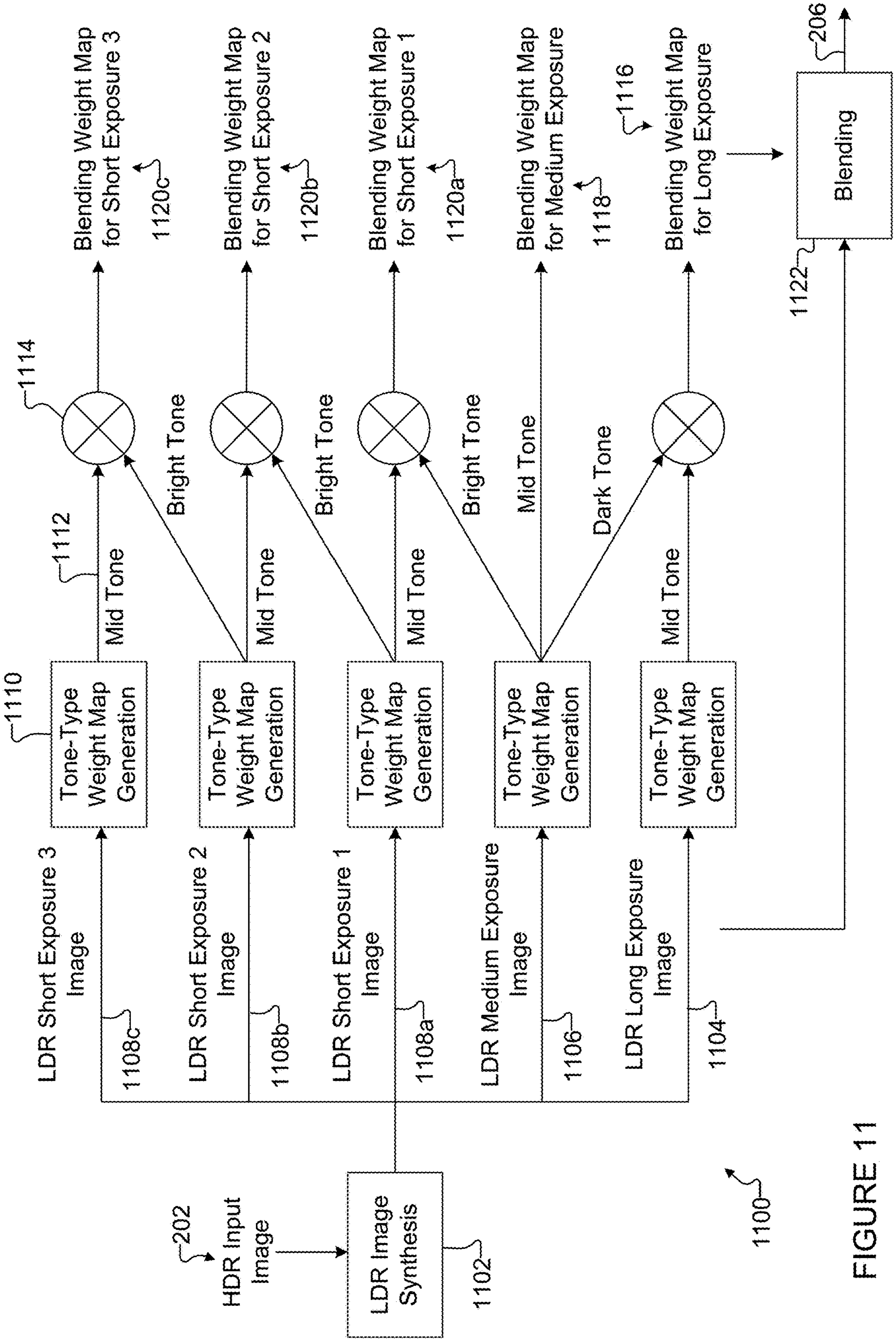
FIG. 11 illustrates an example architecture for sequential weight generation for tone fusion in accordance with this disclosure.

FIG. 11 illustrates an example architecture 1100 for sequential weight generation for tone fusion in accordance with this disclosure. For ease of explanation, the architecture 1100 shown in FIG. 11 is described as being used by the tone fusion operation 204 in the pipeline 200 shown in FIG. 2, which may be implemented on or supported by the electronic device 101 in the network configuration 100 of FIG. 1. However, the architecture 1100 shown in FIG. 11 could be used with any other suitable device(s) and pipeline(s) and in any other suitable system(s), such as when the architecture 1100 is implemented on or supported by the server 106.

As shown in FIG. 11, the architecture 1100 generally operates to receive and process the HDR input images 202. As noted above, the HDR input images 202 may be generated in any suitable manner, such as by the electronic device 101 or other device or system that implements the architecture 1100. Each HDR input image 202 is provided to an LDR image synthesis function 1102, which generally operates to generate various LDR images 1104, 1106, 1108*a*-1108*c* based on the HDR input image 202. Each LDR image 1104, 1106, 1108*a*-1108*c* represents an image that individually has a lower dynamic range than the associated HDR input image 202. The LDR image synthesis function 1102 can use any suitable technique(s) to generate LDR images using HDR images. One example implementation of the LDR image synthesis function 1102 is shown in FIGS. 12 through 15, which are discussed below.

At least some of the LDR images 1104, 1106, 1108*a*-1108*c* generated by the LDR image synthesis function 1102 can be associated with different exposure levels. For example, the LDR images can include one or more LDR long exposure images, one or more LDR medium exposure images, and one or more LDR short exposure images. Note that the terms "long," "medium," and "short" here do not impart any specific exposure levels on LDR images. Rather, the term "long" simply indicates that the one or more LDR long exposure images have a longer exposure level than the LDR medium and short exposure images. The term "medium" simply indicates that the one or more LDR medium exposure images have a longer exposure level than the LDR short exposure image(s) and a shorter exposure level than the LDR long exposure image(s). The term "short" simply indicates that the one or more LDR short exposure images have a shorter exposure level than the LDR medium and long exposure images. Also note that the LDR image synthesis function 1102 can generate any suitable numbers of long, medium, and short LDR images based on an HDR input image 202. In this particular example, the LDR image synthesis function 1102 generates one LDR long exposure image 1104, one LDR medium exposure image 1106, and three LDR short exposure images 1108*a*-1108*c*, although this is for illustration and explanation only.

Each LDR image 1104, 1106, 1108*a*-1108*c* is provided to a tone-type weight map generation function 1110, which generally operates to process the LDR image and generate at least one tone weight map 1112 for the LDR image. Each tone weight map 1112 generally identifies the tonal contents of the associated LDR image. Each tone-type weight map generation function 1110 can generate one or more tone weight maps 1112 for the associated LDR image in one or more tone ranges, and the tone range or ranges that are used can vary depending on which LDR image is being processed. For example, the tone-type weight map generation function 1110 processing the LDR long exposure image 1104 can generate a mid tone weight map 1112. The tone-type weight map generation function 1110 processing the LDR medium exposure image 1106 can generate a bright tone weight map 1112, a mid tone weight map 1112, and a dark tone weight map 1112. The tone-type weight map generation function 1110 processing the first or second LDR short exposure image 1108*a* or 1108*b* can generate a bright tone weight map 1112 and a mid tone weight map 1112. The tone-type weight map generation function 1110 processing the third LDR short exposure image 1108*c* can generate a mid tone weight map 1112. Note that the terms "bright," "mid," and "dark" here do not impart any specific tone levels or tone ranges. Rather, the term "bright" simply indicates that bright tones are brighter than mid and dark tones. The term "mid" simply indicates that mid tones are brighter than dark tones and not brighter than bright tones. The term "dark" simply indicates that dark tones are darker than bright and mid tones.

Figure 16:
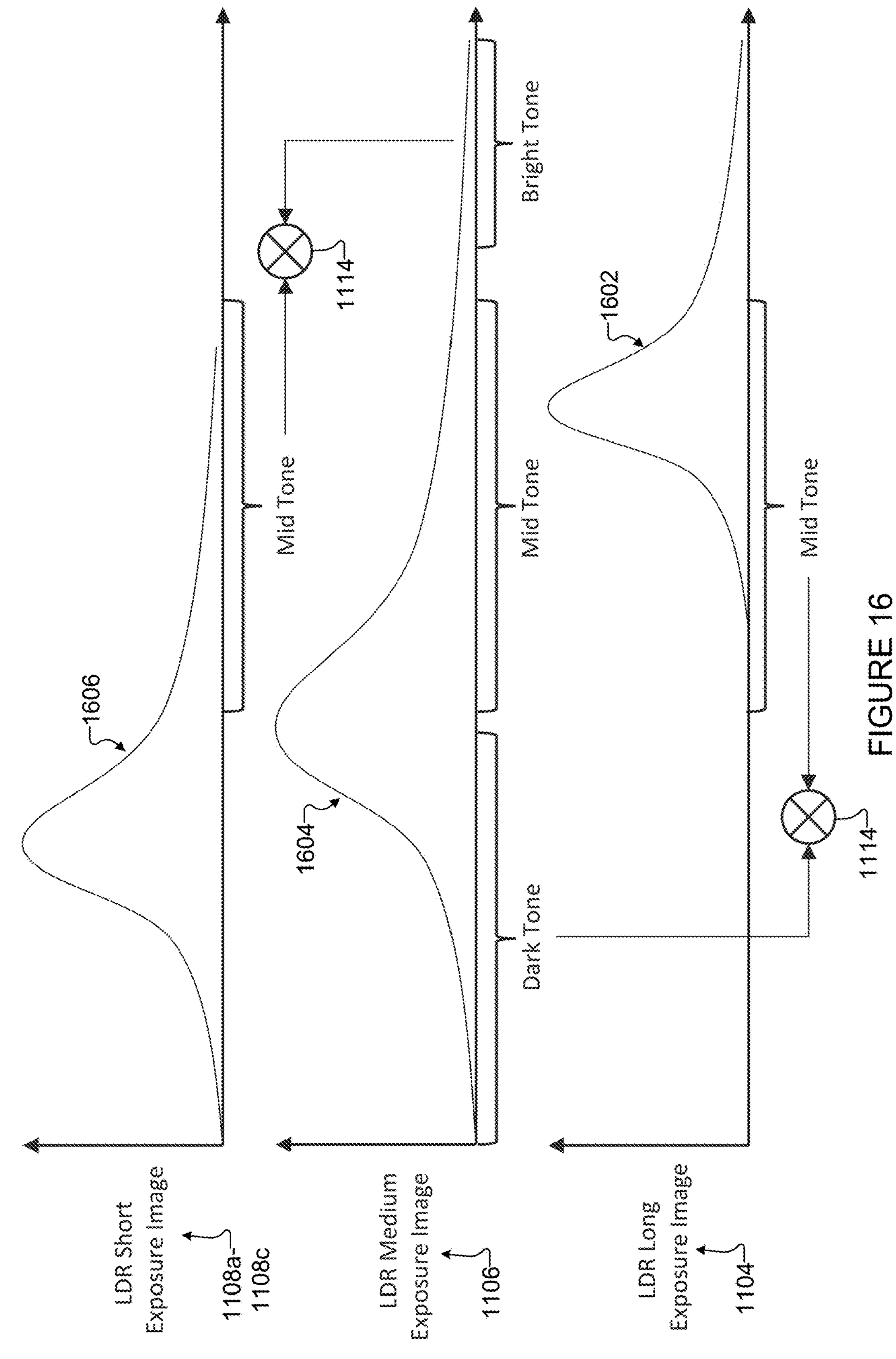
FIG. 16 illustrates example combinations of different tone weight maps for different images during generation of blending weights in the architecture of FIG. 11 in accordance with this disclosure.
Figure 17:
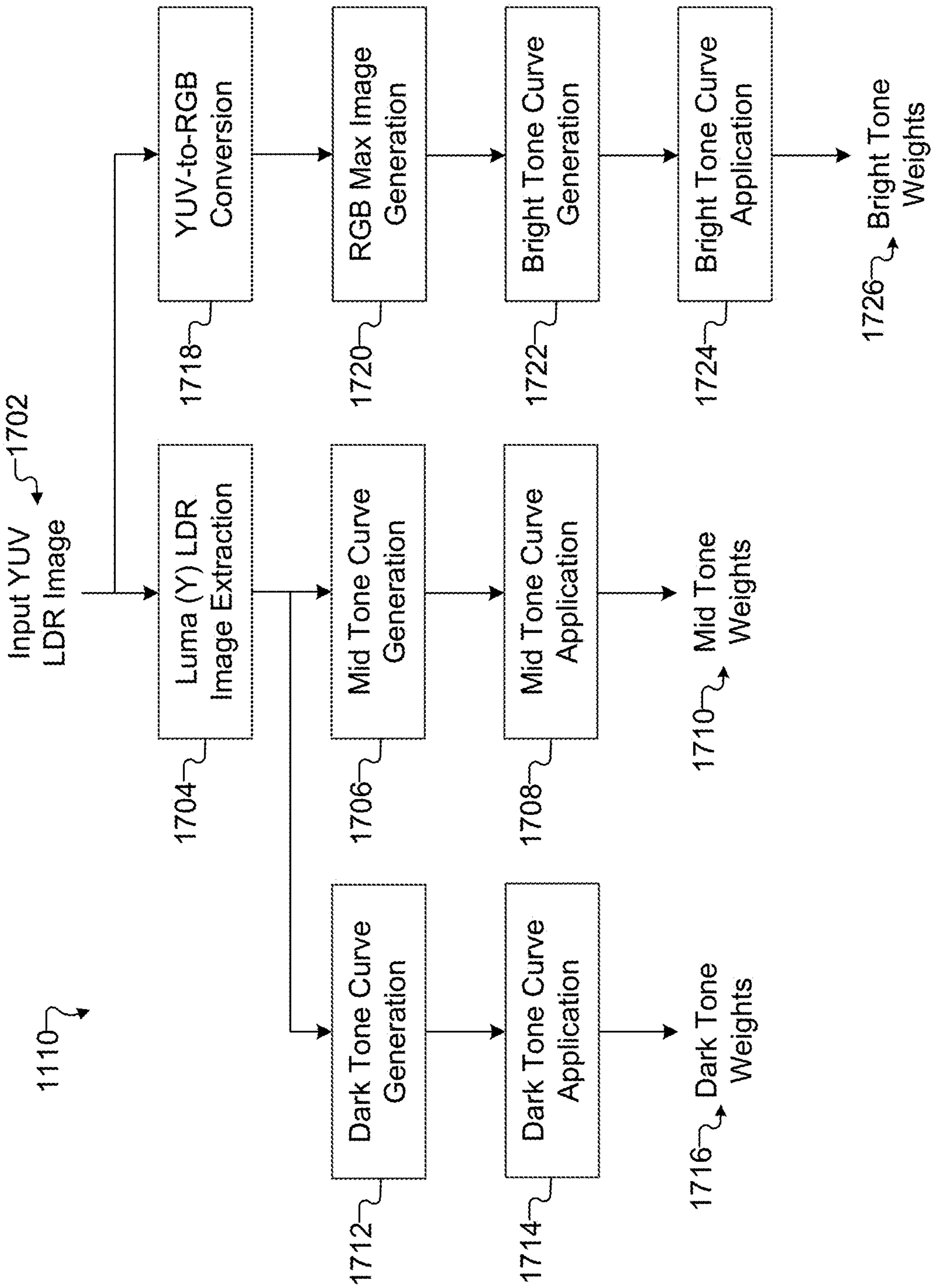
FIG. 17 illustrates an example tone-type weight map generation function in the architecture of FIG. 11 in accordance with this disclosure.

Each tone-type weight map generation function 1110 can use any suitable technique(s) to generate one or more tone weight maps 1112 for LDR images. In some embodiments, each tone-type weight map generation function 1110 can generate one or more tone weight maps 1112 for LDR images based on one or more metrics associated with the LDR images, such as well-exposedness, color saturation, and saliency metrics associated with the LDR images. Example operations of the tone-type weight map generation function 1110 are shown in FIG. 16, which is discussed below. Also, one example implementation of the tone-type weight map generation function 1110 is shown in FIG. 17, which is discussed below.

The architecture 1100 also allows for certain tone weight maps 1112 associated with different LDR images at different exposure levels and with different tone ranges to be combined using various combiner functions 1114. In some cases, for example, each combiner function 1114 may represent a multiplier that can multiply each value in one tone weight map 1112 by a corresponding value in another tone weight map 1112. In this example, the mid tone weight map 1112 for the LDR medium exposure image 1106 may remain unchanged, in which case that tone weight map 1112 may be used as a blending weight map 1118 for the LDR medium exposure image 1106. The combiner function 1114 for the LDR long exposure image 1104 can combine the mid tone weight map 1112 for the LDR long exposure image 1104 and the dark tone weight map 1112 for the LDR medium exposure image 1106 to generate a blending weight map 1116 for the LDR long exposure image 1104. The combiner function 1114 for the first LDR short exposure image 1108*a* can combine the mid tone weight map 1112 for the first LDR short exposure image 1108*a* and the bright tone weight map 1112 for the LDR medium exposure image 1106 to generate a blending weight map 1120*a* for the first LDR short exposure image 1108*a*. The combiner function 1114 for the second LDR short exposure image 1108*b* can combine the mid tone weight map 1112 for the second LDR short exposure image 1108*b* and the bright tone weight map 1112 for the first LDR short exposure image 1108*a* to generate a blending weight map 1120*b* for the second LDR short exposure image 1108*b*. The combiner function 1114 for the third LDR short exposure image 1108*c* can combine the mid tone weight map 1112 for the third LDR short exposure image 1108*c* and the bright tone weight map 1112 for the second LDR short exposure image 1108*b* to generate a blending weight map 1120*c* for the third LDR short exposure image 1108*c*.

The LDR images 1104, 1106, 1108*a*-1108*c* and the blending weight maps 1116, 1118, 1120*a*-1120*c* are provided to a blending function 1122. The blending function 1122 generally operates to blend the LDR images 1104, 1106, 1108*a*-1108*c* based on the blending weight maps 1116, 1118, 1120*a*-1120*c* in order to generate a fused image 206. For example, the blending function 1122 can perform weighted blending of the LDR images 1104, 1106, 1108*a*-1108*c*, where each pixel value in each LDR image is weighted using a corresponding blending weight contained in the associated blending weight map. In this way, the blending function 1122 can be used to perform fusion-based local tone mapping. As described above, if desired, the fused image 206 may undergo processing by the local tone mapping operation 208 and/or by the global tone mapping operation 212. In some cases, the global tone mapping operation 212 can apply non-uniform distribution-based global contrast enhancement in order to provide the global tone mapping.

As can be seen here, the architecture 1100 supports sequential weight generation of weights used for tone fusion. That is, the architecture 1100 can generate the tone weight maps 1112 and then generate the blending weight maps 1116, 1118, 1120*a*-1120*c* based on the tone weight maps 1112. This allows the architecture 1100 to exploit relationships between different LDR images (such as those having different exposure levels) when generating the blending weight maps 1116, 1118, 1120*a*-1120*c*. Among other things, this approach makes it easier to provide desired corrections in different tone ranges. As particular examples, generating and using tone weight maps 1112 in this manner may allow tuning of HDR effects to impact only brighter tone areas of the HDR input image 202 and/or allow halo reduction or brightening tuning to impact only darker tone areas of the HDR input image 202.

Although FIG. 11 illustrates one example of an architecture 1100 for sequential weight generation for tone fusion, various changes may be made to FIG. 11. For example, various components and functions in FIG. 11 may be combined, further subdivided, replicated, rearranged, or omitted according to particular needs. Also, one or more additional components and functions may be included in FIG. 11 if needed or desired. In addition, multiple tone-type weight map generation functions 1110 and multiple combiner functions 1114 are shown in FIG. 11. The tone-type weight map generation functions 1110 may be implemented separately (in which case they may operate in parallel) or may represent the same logic or other component(s) or function(s) that process LDR images sequentially. Similarly, the combiner functions 1114 may be implemented separately (in which case they may operate in parallel) or may represent the same logic or other component(s) or function(s) that process tone weight maps sequentially.

Figure 12:
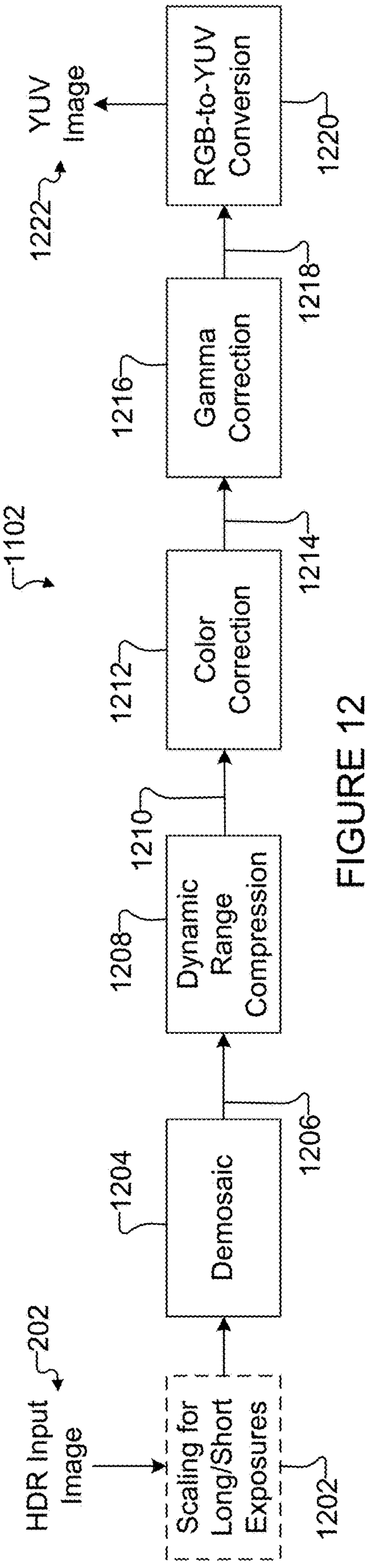
FIG. 12 illustrates an example image synthesis function in the architecture of FIG. 11 in accordance with this disclosure.

FIG. 12 illustrates an example image synthesis function 1102 in the architecture 1100 of FIG. 11 in accordance with this disclosure. As shown in FIG. 12, the image synthesis function 1102 includes an optional scaling operation 1202, which may be used to scale an HDR input image 202. The use of the scaling operation 1202 varies based on whether the image synthesis function 1102 is being used to generate an LDR long exposure image 1104, an LDR medium exposure image 1106, or an LDR short exposure image 1108*a*-1108*c*. For example, when the image synthesis function 1102 is being used to generate an LDR long exposure image 1104, the scaling operation 1202 can multiply values in the HDR input image 202 by a value greater than one. When the image synthesis function 1102 is being used to generate an LDR short exposure image 1108*a*-1108*c*, the scaling operation 1202 can multiply values in the HDR input image 202 by a value less than one. When the image synthesis function 1102 is being used to generate an LDR medium exposure image 1106, the scaling operation 1202 can multiply values in the HDR input image 202 by a value of one or not process the HDR input image 202 at all.

A demosaic operation 1204 generally operates to demosaic image data in color channels of the HDR input image 202 or the scaled version of the HDR input image 202. For example, the demosaic operation 1204 can convert image data produced using a Bayer filter array or other color filter array into reconstructed RGB data or other image data in order to generate a demosaiced image 1206. As a particular example, the demosaic operation 1204 can perform various averaging and/or interpolation calculations to fill in missing information, such as by estimating other colors' image data for each pixel.

Figure 13:
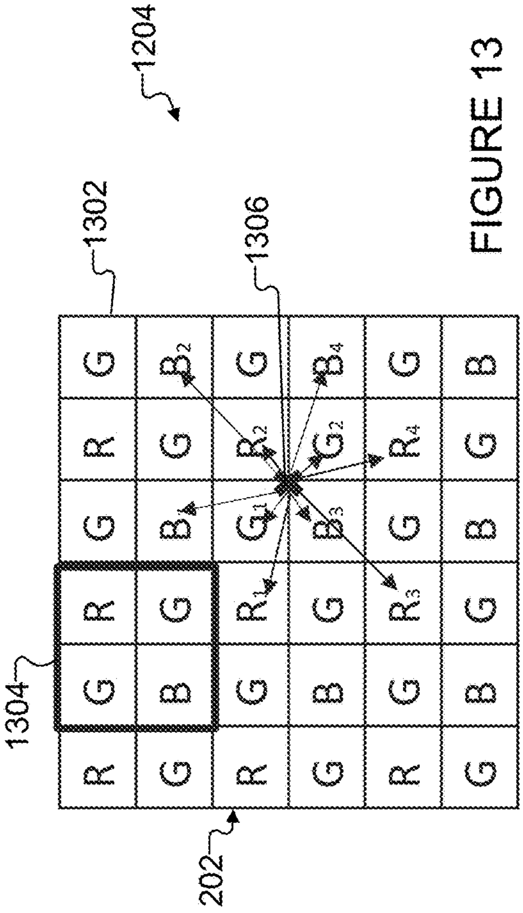
FIG. 13 illustrates an example demosaic operation in the image synthesis function of FIG. 12 in accordance with this disclosure.

FIG. 13 illustrates an example demosaic operation 1204 in the image synthesis function 1102 of FIG. 12 in accordance with this disclosure. As shown in FIG. 13, an HDR input image 202 (or a scaled version thereof) includes various pixel values 1302, where each pixel value is associated with a single color (namely red, green, or blue in this example). When using a Bayer filter array or some other types of color filter arrays, approximately twice as many pixels may capture image data using green filters compared to pixels that capture image data using red or blue filters. That is why the HDR input image 202 includes approximately twice as many green pixel values 1302 as red or blue pixel values 1302. In this example, the HDR input image 202 can be divided into cells 1304, where each cell 1304 contains one red, one blue, and two green pixel values 1302. Note that different cells 1304 may overlap one another since the cells 1304 can represent logical collections of pixel values 1302 rather than physically-separate structures.

The demosaic operation 1204 here can estimate pixel values at specific locations 1306, such as a location at the center of each cell 1304. For example, the demosaic operation 1204 can determine (for each location 1306) an average of the two closest green pixel values 1302, an interpolation of the four closest red pixel values 1302, and an interpolation of the four closest blue pixel values 1302. As a particular example, this may include the processor 120 of the electronic device 101 using the following equations to perform the demosaicing.

$$G_p = \frac{1}{2} * G_1 + \frac{1}{2} * G_2$$

$$R_p = \frac{3}{16} * R_1 + \frac{9}{16} * R_2 + \frac{1}{16} * R_3 + \frac{3}{16} * R_4$$

$$B_p = \frac{3}{16} * B_1 + \frac{1}{16} * B_2 + \frac{9}{16} * B_3 + \frac{3}{16} * B_4$$

Here, $G_p$, $R_p$, and $B_p$ respectively represent the green, red, and blue pixel values determined for the specific location 1306 identified in FIG. 13. The coefficients used in these equations are based on the distances between the pixel values 1302 and the specific location 1306. In some cases, a demosaiced image 1206 generated using an HDR input image 202 may be half the size of the HDR input image 202.

Returning to FIG. 12, various image processing operations are performed using the demosaiced image 1206 in order to generate an LDR image. For example, a dynamic range compression (DRC) operation 1208 may generally operate to compress the dynamic range of the demosaiced image 1206 and generate a compressed dynamic range image 1210. For example, the DRC operation 1208 may apply a variable gain to the pixel values in the demosaiced image 1206, where the variable gain is based on luminances of the pixel values in the demosaiced image 1206.

Figure 14:
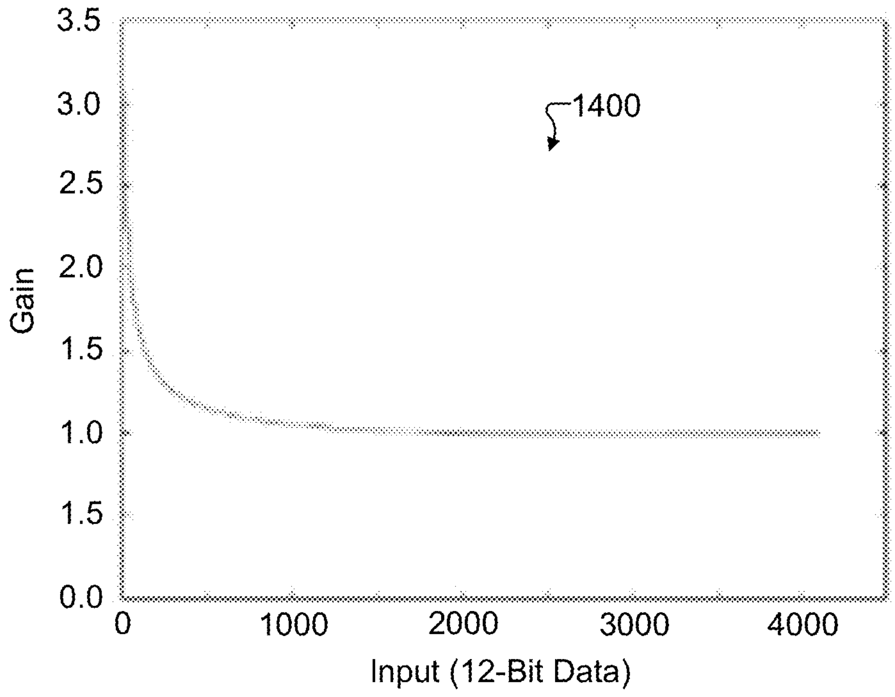
FIG. 14 illustrates an example lookup table that may be used by a dynamic range compression (DRC) operation in the image synthesis function of FIG. 12 in accordance with this disclosure.

In some embodiments, the DRC operation 1208 may use a lookup table that holds the gain values to be applied to the pixel values of the demosaiced image 1206. FIG. 14 illustrates an example lookup table 1400 that may be used by the DRC operation 1208 in the image synthesis function 1102 of FIG. 12 in accordance with this disclosure. As shown in FIG. 14, higher gains can be applied to pixel values associated with lower intensities, and one or more lower gains can be applied to pixel values associated with higher intensities. Note that the use of twelve-bit data values in FIG. 14 is an example only and can vary as needed or desired. As a particular example, this may include the processor 120 of the electronic device 101 using the following equations to perform dynamic range compression.

$$Y_p = 0.25 * R_p + 0.5 * G_p + 0.25 * B_p$$

$$g_p = DRC(Y_p)$$

Here, $Y_p$ represents the calculated luminance of a pixel based on its red, green, and blue pixel values. Also, $g_p$ represents the gain to be applied to each pixel as retrieved from the lookup table 1400. The compressed dynamic range image 1210 generated by the DRC operation 1208 represents the product of each pixel represented in the demosaiced image 1206 and its corresponding gain. As a particular example, this may include the processor 120 of the electronic device 101 using the following equations to generate the compressed dynamic range image 1210.

$$\tilde{R}_p = R_p * g_p,\ \tilde{B}_p = B_p * g_p,\ \tilde{G}_p = G_p * g_p$$

Here, $\tilde{R}_p$, $\tilde{B}_p$, and $\tilde{G}_p$ represent the product of each pixel represented in the demosaiced image 1206 and that pixel's corresponding gain.

The compressed dynamic range image 1210 is provided to a color correction operation 1212, which generally operates to adjust the colors contained in the compressed dynamic range image 1210 and generate a color-corrected image 1214. For example, the color correction operation 1212 can adjust colors of the compressed dynamic range image 1210 (an RGB image) into colors suitable for viewing on a display, such as the display 160 of the electronic device 101. The color correction operation 1212 can use any suitable technique(s) for adjusting colors of an RGB image or other image. In some cases, for instance, the color correction operation 1212 may use a color correction matrix to transform RGB values in the compressed dynamic range image 1210 into RGB values in the color-corrected image 1214 (which are suitable for display). As a particular example, this may include the processor 120 of the electronic device 101 using the following equation to transform the RGB values.

$$\begin{bmatrix} \hat{R}_p \\ \hat{G}_p \\ \hat{B}_p \end{bmatrix} = \begin{bmatrix} c_{11} & c_{12} & c_{13} \\ c_{21} & c_{22} & c_{22} \\ c_{31} & c_{32} & c_{33} \end{bmatrix} \begin{bmatrix} \tilde{R}_p \\ \tilde{G}_p \\ \tilde{B}_p \end{bmatrix}$$

Here, $\hat{R}_p$, $\hat{G}_p$, and $\hat{B}_p$ represent the transformed RGB values suitable for display. Also, $c_{11}$-$c_{13}$, $c_{21}$-$c_{23}$, and $c_{31}$-$c_{33}$ represent values of the color correction matrix.

Figure 15:
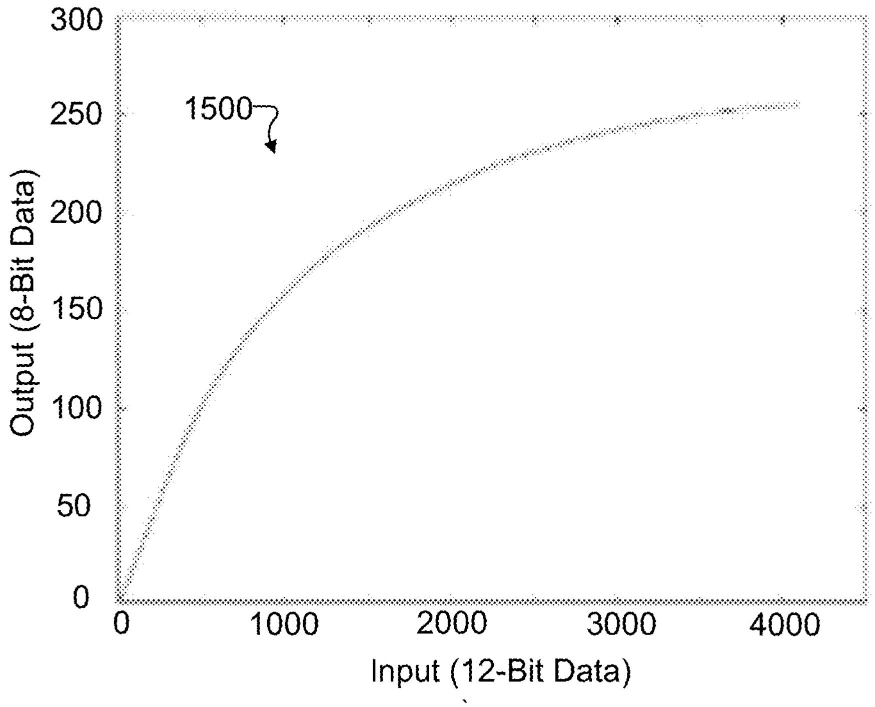
FIG. 15 illustrates an example lookup table that may be used by a gamma correction operation in the image synthesis function of FIG. 12 in accordance with this disclosure.

The color-corrected image 1214 is provided to a gamma correction operation 1216, which generally operates to lower the dynamic range of the color-corrected image 1214 and generate a lower-dynamic range image 1218. For example, the gamma correction operation 1216 may reduce the bit depth of the image data in the color-corrected image 1214 so that the image data in the lower-dynamic range image 1218 has fewer bits. As a particular example, the gamma correction operation 1216 can convert twelve-bit image data into eight-bit image data, although this is for illustration and explanation only. The gamma correction operation 1216 can also apply a nonlinear operation to simulate the manner in which people perceive light and color. In some embodiments, the gamma correction operation 1216 may use a lookup table that defines a mapping used to convert values associated with the color-corrected image 1214 into values associated with the lower-dynamic range image 1218. FIG. 15 illustrates an example lookup table 1500 that may be used by the gamma correction operation 1216 in the image synthesis function 1102 of FIG. 12 in accordance with this disclosure. As shown in FIG. 15, the lookup table 1500 maps input image data values to output image data values. As a particular example, this may include the processor 120 of the electronic device 101 using the following equations to provide gamma correction.

$$RN_p = \left(\frac{\hat{R}_p}{2^{12}}\right)^{\gamma} * 2^8,\ GN_p = \left(\frac{\hat{G}_p}{2^{12}}\right)^{\gamma} * 2^8,\ BN_p = \left(\frac{\hat{B}_p}{2^{12}}\right)^{\gamma} * 2^8$$

Here, $RN_p$, $GN_p$, and $BN_p$ represent gamma-corrected pixel values in the lower-dynamic range image 1218.

The lower-dynamic range image 1218 is provided to an RGB-to-YUV conversion operation 1220, which generally operates to convert the lower-dynamic range image 1218 from the RGB domain to the YUV domain. This results in the generation of a YUV image 1222, which represents one of the LDR images 1104, 1106, 1108*a*-1108*c*. The same process can be repeated using the LDR image synthesis function 1102 multiple times in order to generate all of the LDR images 1104, 1106, 1108*a*-1108*c* described above.

Although FIGS. 12 through 15 illustrate one example of an image synthesis function 1102 in the architecture 1100 of FIG. 11 and related details, various changes may be made to FIGS. 12 through 15. For example, various components and functions in FIG. 12 may be combined, further subdivided, replicated, rearranged, or omitted according to particular needs. Also, one or more additional components and functions may be included in FIG. 12 if needed or desired. Further, the specific demosaic technique shown in FIG. 13 is an example only, and other demosaic techniques may be used. In addition, the contents of FIGS. 14 and 15 are examples only, and other lookup tables or other techniques may be used to perform dynamic range compression and gamma correction.

FIG. 16 illustrates example combinations of different tone weight maps 1112 for different images during generation of blending weights in the architecture 1100 of FIG. 11 in accordance with this disclosure. As shown in FIG. 16, a histogram curve 1602 represents tone weights that may be generated by the tone-type weight map generation function 1110 for the LDR long exposure image 1104. A histogram curve 1604 represents tone weights that may be generated by the tone-type weight map generation function 1110 for the LDR medium exposure image 1106. A histogram curve 1606 represents tone weights that may be generated by the tone-type weight map generation function 1110 for one of the LDR short exposure images 1108*a*-1108*c*.

As can be seen here, the curves 1602, 1604, 1606 are higher in different locations, which indicates that the tonal contents of the curves 1602, 1604, 1606 are different for different tones or tone ranges. For example, the curve 1602 peaks later than the curves 1604 and 1606, which indicates that the curve 1602 can contain more information regarding higher (brighter) tones. As another example, the curve 1606 peaks earlier than the curves 1602 and 1604, which indicates that the curve 1606 can contain more information regarding lower (darker) tones.

The combiner functions 1114 can be used as described above to combine tonal information from multiple curves 1602, 1604, 1606, which can help to improve the results obtained using the architecture 1100. For example, the lower combiner function 1114 in FIG. 16 can be used to combine information about dark tones (such as in a dark tone weight map 1112) for the LDR medium exposure image 1106 and information about mid tones (such as in a mid tone weight map 1112) for the LDR long exposure image 1104. Similarly, the upper combiner function 1114 in FIG. 16 can be used to combine information about bright tones (such as in a bright tone weight map 1112) for the LDR medium exposure image 1106 and information about mid tones (such as in a mid tone weight map 1112) for the LDR short exposure image 1108*a*-1108*c*. This allows various ones of the blending weight maps 1116, 1118, 1120*a*-1120*c* to be generated based on multiple tone weight maps 1112.

Although FIG. 16 illustrates one example of combinations of different tone weight maps 1112 for different images during generation of blending weights in the architecture 1100 of FIG. 11, various changes may be made to FIG. 16. For example, the specific curves 1602, 1604, 1606 shown in FIG. 16 are examples only and can easily vary, such as based on the images being processed. Also, the divisions of the curves 1602, 1604, 1606 into dark, mid, and bright tone regions shown in FIG. 16 are examples only and can easily vary depending on the implementation. As a particular example, while the tone regions for the curve 1604 are separated by gaps in FIG. 16, these tone regions may be continuous. In addition, the curves 1602, 1604, 1606 here do not imply that all tone-type weight map generation functions 1110 necessarily generate tone weight maps 1112 for all three tone ranges.

FIG. 17 illustrates an example tone-type weight map generation function 1110 in the architecture 1100 of FIG. 11 in accordance with this disclosure. As shown in FIG. 17, the tone-type weight map generation function 1110 generally operates to receive and process an input YUV LDR image 1702, such as a YUV image 1222 generated by the image synthesis function 1102 as described above. The input YUV LDR image 1702 is provided to a luma (Y) LDR image extraction operation 1704, which generally operates to extract the luma or "Y" channel from the YUV LDR image 1702 in order to generate a luma image. The luma image may contain only luminance values (not chrominance values) from the YUV LDR image 1702.

The luma image is provided to a mid tone curve generation operation 1706, which generally operates to generate a mid tone curve to be applied to the luma image. For example, the mid tone curve generation operation 1706 may generate the mid tone curve as a centered Gaussian curve. The mid tone curve can define weights to be applied to the luma image based on luminance values in the luma image. A mid tone curve application operation 1708 applies the mid tone curve to the luma image, which operates to transform the luma image and generate mid tone weights 1710 for the luma image. The mid tone weights 1710 here can form a mid tone weight map 1112 for the input YUV LDR image 1702.

The luma image is also provided to a dark tone curve generation operation 1712, which generally operates to generate a dark tone curve to be applied to the luma image. For example, the dark tone curve generation operation 1712 may generate the dark tone curve as a left-shifted version of the centered Gaussian curve used as the mid tone curve. Again, the dark tone curve can define weights to be applied to the luma image based on luminance values in the luma image. A dark tone curve application operation 1714 applies the dark tone curve to the luma image, which operates to transform the luma image and generate dark tone weights 1716 for the luma image. The dark tone weights 1716 here can form a dark tone weight map 1112 for the input YUV LDR image 1702.

The luma image is further provided to a YUV-to-RGB conversion operation 1718, which converts the luma image into an RGB image. The RGB image is provided to an RGB max image generation operation 1720, which identifies the maximum of the red, green, and blue pixel values for each pixel of the RGB image. The maximum values are used to form an RGB max image, which is provided to a bright tone curve generation operation 1722. The bright tone curve generation operation 1722 generally operates to generate a bright tone curve to be applied to the RGB max image. For example, the bright tone curve generation operation 1722 may generate the bright tone curve as a right-shifted version of the centered Gaussian curve used as the mid tone curve. The bright tone curve can define weights to be applied to the RGB max image based on pixel values in the RGB max image. A bright tone curve application operation 1724 applies the bright tone curve to the RGB max image, which operates to transform the RGB max image and generate bright tone weights 1726 for the RGB max image. The bright tone weights 1726 here can form a bright tone weight map 1112 for the input YUV LDR image 1702.

Although FIG. 17 illustrates one example of a tone-type weight map generation function 1110 in the architecture 1100 of FIG. 11, various changes may be made to FIG. 17. For example, the tone-type weight map generation function 1110 in FIG. 17 is assumed to generate weights for a bright tone weight map 1112, a mid tone weight map 1112, and a dark tone weight map 1112. However, as shown in FIG. 11, the tone-type weight map generation function 1110 for the LDR long exposure image 1104 and the tone-type weight map generation function 1110 for the LDR short exposure image 1108*c* may only generate a mid tone weight map 1112, in which case the elements generating the dark tone weights 1716 and the bright tone weights 1726 may be omitted or not used. Similarly, the tone-type weight map generation function 1110 for the LDR short exposure image 1108*a* and the tone-type weight map generation function 1110 for the LDR short exposure image 1108*b* may only generate a mid tone weight map 1112 and a bright tone weight map 1112, in which case the elements generating the dark tone weights 1716 may be omitted or not used.

Figure 18:
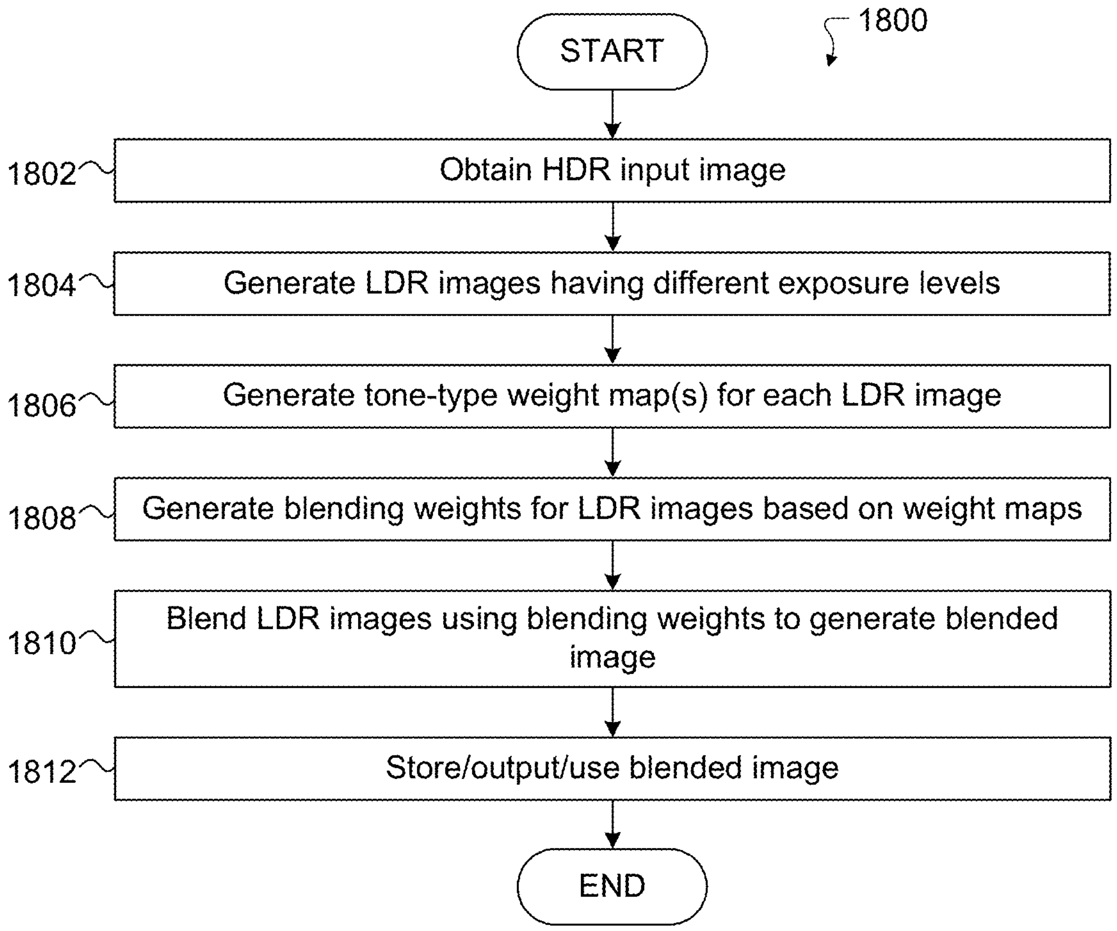
FIG. 18 illustrates an example method for sequential weight generation for tone fusion in accordance with this disclosure.

FIG. 18 illustrates an example method 1800 for sequential weight generation for tone fusion in accordance with this disclosure. For ease of explanation, the method 1800 shown in FIG. 18 is described as being performed by the electronic device 101 in the network configuration 100 of FIG. 1, where the electronic device 101 can implement the pipeline 200 shown in FIG. 2 and the architecture 1100 shown in FIG. 11. However, the method 1800 shown in FIG. 18 could be performed by any other suitable device(s), pipeline(s), and architecture(s) and in any other suitable system(s), such as when the method 1800 is performed using the server 106.

As shown in FIG. 18, an HDR input image is obtained at step 1802. This may include, for example, the processor 120 of the electronic device 101 generating or otherwise obtaining an HDR input image 202. The HDR input image 202 may be generated by the electronic device 101 itself or obtained from an external source. LDR images (at least some of which have different exposure levels) are generated based on the HDR input image at step 1804. This may include, for example, the processor 120 of the electronic device 101 performing the LDR image synthesis function 1102 to generate LDR images 1104, 1106, 1108*a*-1108*c*. As a particular example, the LDR image synthesis function 1102 may be used to generate one LDR long exposure image 1104, one LDR medium exposure image 1106, and three LDR short exposure images 1108*a*-1108*c* based on the HDR input image 202.

One or more tone-type weight maps are generated for each LDR image at step 1806. This may include, for example, the processor 120 of the electronic device 101 performing the tone-type weight map generation functions 1110 to generate at least one tone weight map 1112 for each LDR image 1104, 1106, 1108*a*-1108*c*. As a particular example, the tone-type weight map generation functions 1110 may be used to generate a mid tone weight map 1112 for the LDR long exposure image 1104; a bright tone weight map 1112, a mid tone weight map 1112, and a dark tone weight map 1112 for the LDR medium exposure image 1106; a bright tone weight map 1112 and a mid tone weight map 1112 for each of the first and second LDR short exposure images 1108*a* and 1108*b*; and a mid tone weight map 1112 for the third LDR short exposure image 1108*c*.

Blending weights are generated for the LDR images based on the tone-type weight maps at step 1808. This may include, for example, the processor 120 of the electronic device 101 using the mid tone weight map 1112 for the LDR medium exposure image 1106 as the blending weight map 1118 for the LDR medium exposure image 1106. This may also include the processor 120 of the electronic device 101 using the combiner functions 1114 to combine various mid tone weight maps 1112 with dark and/or bright tone weight maps 1112 to generate the blending weight maps 1116, 1120*a*-1120*c*.

The LDR images are blended based on the blending weights to generate a blended image at step 1810. This may include, for example, the processor 120 of the electronic device 101 performing the blending function 1122 to combine the image data of the LDR images 1104, 1106, 1108*a*-1108*c* using weighted blending based on the blending weights in the blending weight maps 1116, 1118, 1120*a*-1120*c*. The blended image can represent a fused image 206. The blended image is stored, output, or used in some manner at step 1812. For example, the fused image 206 may be provided to a subsequent processing operation (such as the local tone mapping operation 208 and/or the global tone mapping operation 212), displayed on the display 160 of the electronic device 101, saved to a camera roll stored in a memory 130 of the electronic device 101, or attached to a text message, email, or other communication to be transmitted from the electronic device 101. Of course, the fused image 206 could be used in any other or additional manner.

Although FIG. 18 illustrates one example of a method 1800 for sequential weight generation for tone fusion, various changes may be made to FIG. 18. For example, while shown as a series of steps, various steps in FIG. 18 may overlap, occur in parallel, occur in a different order, or occur any number of times (including zero times). As particular examples, one or more pre-processing operations may be performed on the HDR input image 202, and/or one or more post-processing operations may be performed on the fused image 206.

It should be noted that the functions shown in or described with respect to FIGS. 2 through 18 can be implemented in an electronic device 101, server 106, or other device in any suitable manner. For example, in some embodiments, at least some of the functions shown in or described with respect to FIGS. 2 through 18 can be implemented or supported using one or more software applications or other software instructions that are executed by the processor 120 of the electronic device 101, server 106, or other device. In other embodiments, at least some of the functions shown in or described with respect to FIGS. 2 through 18 can be implemented or supported using dedicated hardware components. In general, the functions shown in or described with respect to FIGS. 2 through 18 can be performed using any suitable hardware or any suitable combination of hardware and software/firmware instructions. Also, the functions shown in or described with respect to FIGS. 2 through 18 can be performed by a single device or by multiple devices.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
obtaining a high dynamic range (HDR) image;
generating low dynamic range (LDR) images based on the HDR image, at least some of the LDR images associated with different exposure levels;
generating tone-type weight maps based on the LDR images, at least one of the LDR images associated with two or more of the tone-type weight maps;
generating blending weights for the LDR images based on the tone-type weight maps, the blending weights for at least one of the LDR images based on at least two tone-type weight maps associated with at least two of the LDR images;
performing fusion-based local tone mapping based on the blending weights in order to fuse the LDR images and generate a fused image; and
performing global tone mapping on the fused image in order to generate a tone-mapped image, wherein performing the global tone mapping comprises applying non-uniform distribution-based global contrast enhancement.

2. The method of claim 1, wherein applying the non-uniform distribution-based global contrast enhancement comprises:
generating an image histogram based on the fused image;
identifying a clip limit based on a specified contrast strength;
updating the image histogram based on the clip limit in order to generate an updated image histogram;
generating an image transform based on the updated image histogram;
updating the image transform based on specified beta coefficient values in order to generate an updated image transform; and applying the updated image transform to the fused image in order to generate the tone-mapped image.

3. The method of claim 1, wherein the LDR images comprise:

an LDR long exposure image having a first exposure level;

an LDR medium exposure image having a second exposure level shorter than the first exposure level; and multiple LDR short exposure images having a third exposure level shorter than the second exposure level.

4. The method of claim 3, wherein generating the tone-type weight maps comprises:

generating a mid tone weight map for the LDR long exposure image;

generating a dark tone weight map, a mid tone weight map, and a bright tone weight map for the LDR medium exposure image; and generating a mid tone weight map and a bright tone weight map for each of the LDR short exposure images.

5. The method of claim 4, wherein generating the blending weights comprises:

generating the blending weights for the LDR long exposure image using the mid tone weight map for the LDR long exposure image and the dark tone weight map for the LDR medium exposure image;

using the mid tone weight map for the LDR medium exposure image as the blending weights for the LDR medium exposure image; and for each of the LDR short exposure images, generating the blending weights for the LDR short exposure image using the mid tone weight map for the LDR short exposure image and the bright tone weight map for the LDR medium exposure image or another of the LDR short exposure images.

6. The method of claim 1, wherein generating the tone-type weight maps comprises, for each of at least one of the LDR images:

obtaining a luma image based on the LDR image;

applying a mid tone curve to the luma image in order to generate mid tone weights;

applying a dark tone curve to the luma image in order to generate dark tone weights;

generating a red-green-blue (RGB) max image based on the LDR image; and applying a bright tone curve to the RGB max image in order to generate bright tone weights.

7. The method of claim 1, wherein blending the LDR images comprises performing weighted blending of the LDR images such that pixel values in each LDR image are weighted using corresponding blending weights contained in an associated blending weight map.

8. An electronic device comprising:

at least one processor configured to:

obtain a high dynamic range (HDR) image;

generate low dynamic range (LDR) images based on the HDR image, at least some of the LDR images associated with different exposure levels;

generate tone-type weight maps based on the LDR images, at least one of the LDR images associated with two or more of the tone-type weight maps;

generate blending weights for the LDR images based on the tone-type weight maps, the blending weights for at least one of the LDR images based on at least two tone-type weight maps associated with at least two of the LDR images;

perform fusion-based local tone mapping based on the blending weights in order to fuse the LDR images and generate a fused image; and perform global tone mapping on the fused image in order to generate a tone-mapped image, wherein, to perform the global tone mapping, the at least one processor is configured to apply non-uniform distribution-based global contrast enhancement.

9. The electronic device of claim 8, wherein, to apply the non-uniform distribution-based global contrast enhancement, the at least one processor is configured to:

generate an image histogram based on the fused image;

identify a clip limit based on a specified contrast strength;

update the image histogram based on the clip limit in order to generate an updated image histogram;

generate an image transform based on the updated image histogram;

update the image transform based on specified beta coefficient values in order to generate an updated image transform; and apply the updated image transform to the fused image in order to generate the tone-mapped image.

10. The electronic device of claim 8, wherein the LDR images comprise:

an LDR long exposure image having a first exposure level;

an LDR medium exposure image having a second exposure level shorter than the first exposure level; and multiple LDR short exposure images having a third exposure level shorter than the second exposure level.

11. The electronic device of claim 10, wherein, to generate the tone-type weight maps, the at least one processor is configured to:

generate a mid tone weight map for the LDR long exposure image;

generate a dark tone weight map, a mid tone weight map, and a bright tone weight map for the LDR medium exposure image; and generate a mid tone weight map and a bright tone weight map for each of the LDR short exposure images.

12. The electronic device of claim 11, wherein, to generate the blending weights, the at least one processor is configured to:

generate the blending weights for the LDR long exposure image using the mid tone weight map for the LDR long exposure image and the dark tone weight map for the LDR medium exposure image;

use the mid tone weight map for the LDR medium exposure image as the blending weights for the LDR medium exposure image; and for each of the LDR short exposure images, generate the blending weights for the LDR short exposure image using the mid tone weight map for the LDR short exposure image and the bright tone weight map for the LDR medium exposure image or another of the LDR short exposure images.

13. The electronic device of claim 8, wherein, to generate the tone-type weight maps, the at least one processor is configured, for each of at least one of the LDR images, to:

obtain a luma image based on the LDR image;

apply a mid tone curve to the luma image in order to generate mid tone weights;

apply a dark tone curve to the luma image in order to generate dark tone weights;

generate a red-green-blue (RGB) max image based on the LDR image; and apply a bright tone curve to the RGB max image in order to generate bright tone weights.

14. A non-transitory machine readable medium containing instructions that when executed cause at least one processor of an electronic device to:

obtain a high dynamic range (HDR) image;

generate low dynamic range (LDR) images based on the HDR image, at least some of the LDR images associated with different exposure levels;

generate tone-type weight maps based on the LDR images, at least one of the LDR images associated with two or more of the tone-type weight maps;

generate blending weights for the LDR images based on the tone-type weight maps, the blending weights for at least one of the LDR images based on at least two tone-type weight maps associated with at least two of the LDR images;

perform fusion-based local tone mapping based on the blending weights in order to fuse the LDR images and generate a fused image; and perform global tone mapping on the fused image in order to generate a tone-mapped image, wherein the instructions that when executed cause the at least one processor to perform the global tone mapping comprise instructions that when executed cause the at least one processor to apply non-uniform distribution-based global contrast enhancement.

15. The non-transitory machine readable medium of claim 14, wherein the instructions that when executed cause the at least one processor to apply the non-uniform distribution-based global contrast enhancement comprise instructions that when executed cause the at least one processor to:

generate an image histogram based on the fused image;

identify a clip limit based on a specified contrast strength;

update the image histogram based on the clip limit in order to generate an updated image histogram;

generate an image transform based on the updated image histogram;

update the image transform based on specified beta coefficient values in order to generate an updated image transform; and apply the updated image transform to the fused image in order to generate the tone-mapped image.

16. The non-transitory machine readable medium of claim 14, wherein the LDR images comprise:

an LDR long exposure image having a first exposure level;

an LDR medium exposure image having a second exposure level shorter than the first exposure level; and multiple LDR short exposure images having a third exposure level shorter than the second exposure level.

17. The non-transitory machine readable medium of claim 16, wherein the instructions that when executed cause the at least one processor to generate the tone-type weight maps comprise instructions that when executed cause the at least one processor to:

generate a mid tone weight map for the LDR long exposure image;

generate a dark tone weight map, a mid tone weight map, and a bright tone weight map for the LDR medium exposure image; and generate a mid tone weight map and a bright tone weight map for each of the LDR short exposure images.

18. The non-transitory machine readable medium of claim 17, wherein the instructions that when executed cause the at least one processor to generate the blending weights comprise instructions that when executed cause the at least one processor to:

generate the blending weights for the LDR long exposure image using the mid tone weight map for the LDR long exposure image and the dark tone weight map for the LDR medium exposure image;

use the mid tone weight map for the LDR medium exposure image as the blending weights for the LDR medium exposure image; and for each of the LDR short exposure images, generate the blending weights for the LDR short exposure image using the mid tone weight map for the LDR short exposure image and the bright tone weight map for the LDR medium exposure image or another of the LDR short exposure images.

19. The non-transitory machine readable medium of claim 14, wherein the instructions that when executed cause the at least one processor to generate the tone-type weight maps comprise instructions that when executed cause the at least one processor, for each of at least one of the LDR images, to:

obtain a luma image based on the LDR image;

apply a mid tone curve to the luma image in order to generate mid tone weights;

apply a dark tone curve to the luma image in order to generate dark tone weights;

generate a red-green-blue (RGB) max image based on the LDR image; and apply a bright tone curve to the RGB max image in order to generate bright tone weights.

20. The non-transitory machine readable medium of claim 14, wherein the instructions that when executed cause the at least one processor to blend the LDR images comprise:

instructions that when executed cause the at least one processor to perform weighted blending of the LDR images such that pixel values in each LDR image are weighted using corresponding blending weights contained in an associated blending weight map.

* * * * *